United States Patent
Watanabe et al.

(10) Patent No.: US 9,093,706 B2
(45) Date of Patent: Jul. 28, 2015

(54) SI ALLOY-CONTAINING NEGATIVE ELECTRODE ACTIVE MATERIAL FOR ELECTRICAL DEVICES

(75) Inventors: Manabu Watanabe, Yokosuka (JP); Osamu Tanaka, Yokosuka (JP); Masao Yoshida, Zushi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 13/989,260

(22) PCT Filed: Sep. 27, 2011

(86) PCT No.: PCT/JP2011/072016
§ 371 (c)(1),
(2), (4) Date: May 23, 2013

(87) PCT Pub. No.: WO2012/070306
PCT Pub. Date: May 31, 2012

(65) Prior Publication Data
US 2013/0240800 A1    Sep. 19, 2013

(30) Foreign Application Priority Data
Nov. 26, 2010   (JP) .................................. 2010-264123

(51) Int. Cl.
*H01B 1/04* (2006.01)
*H01M 4/38* (2006.01)
*H01M 4/134* (2010.01)
*H01M 10/0525* (2010.01)

(52) U.S. Cl.
CPC .............. *H01M 4/386* (2013.01); *H01M 4/134* (2013.01); *H01B 1/04* (2013.01); *H01M 10/0525* (2013.01); *Y02E 60/122* (2013.01); *Y02T 10/7011* (2013.01)

(58) Field of Classification Search
CPC .......................................................... H01B 1/04
USPC ............................... 252/519.1, 182.1, 519.31
See application file for complete search history.

(56) References Cited

U.S. PATENT DOCUMENTS

| | | |
|---|---|---|
| 6,627,350 B2 | 9/2003 | Hashimoto et al. |
| 7,732,095 B2 | 6/2010 | Christensen et al. |
| 7,972,727 B2 | 7/2011 | Christensen et al. |
| 2002/0001749 A1 | 1/2002 | Hashimoto et al. |
| 2007/0128517 A1 | 6/2007 | Christensen et al. |

(Continued)

FOREIGN PATENT DOCUMENTS

| | | | |
|---|---|---|---|
| CN | 101271974 | * | 9/2008 |
| CN | 101271974 A | | 9/2008 |

(Continued)

OTHER PUBLICATIONS

Taiwanese Office Action, Nov. 11, 2013, 4 pages.

*Primary Examiner* — Mark Kopec
*Assistant Examiner* — William Young
(74) *Attorney, Agent, or Firm* — Foley & Lardner LLP

(57) ABSTRACT

Disclosed is a negative electrode active material for electrical devices, comprising an alloy having a composition represented by the formula: $Si_xC_yAl_z$. In the composition formula: $Si_xC_yAl_z$, x, y and z represent mass percent values and satisfy the following conditions: $x+y+z=100$; $36 \le x <100$; $0<y<64$; and $0<z<64$. The negative electrode active material for electrical devices shows well-balanced characteristics to combine high cycle performance with high initial capacity and high charge/discharge efficiency.

3 Claims, 6 Drawing Sheets

(56) References Cited

U.S. PATENT DOCUMENTS

| | | |
|---|---|---|
| 2009/0173050 A1* | 7/2009 | Travitzky et al. ............ 55/523 |
| 2010/0167126 A1 | 7/2010 | Christensen et al. |
| 2012/0080642 A1* | 4/2012 | Ren et al. ................ 252/182.1 |

FOREIGN PATENT DOCUMENTS

| | | |
|---|---|---|
| JP | 6-325764 A | 11/1994 |
| JP | 7-130358 A | 5/1995 |
| JP | 10-208741 A | 8/1998 |
| JP | 2000-164211 A | 6/2000 |
| JP | 2011-338646 A | 12/2001 |
| JP | 2005-11650 A | 1/2005 |
| JP | 2009-517850 A | 4/2009 |
| JP | 2010-27368 A | 2/2010 |
| JP | 4739462 B1 | 8/2011 |
| TW | 200746514 A | 12/2007 |

* cited by examiner

SI ALLOY-CONTAINING NEGATIVE ELECTRODE ACTIVE MATERIAL FOR ELECTRICAL DEVICES

FIELD OF THE INVENTION

The present invention relates to a Si alloy-containing negative electrode active material for electrical devices and an electrical device using the same. The Si alloy-containing negative electrode active material for electrical devices and the electrical device using the same according to the present invention are suitable for use as e.g. secondary batteries or capacitors in motor-driving power sources and auxiliary power sources for vehicles such as electric vehicles, fuel cell vehicles, hybrid electric vehicles etc.

BACKGROUND ART

In recent years, the reduction of $CO_2$ emissions has been sincerely desired in order to address air pollution and global warming. The automotive industry has a growing expectation on the introduction of electric vehicles (EV) and hybrid electric vehicles (HEV) for the reduction of $CO_2$ emissions and has been intensively working on the development of motor-driving secondary batteries, which become key to the practical application of these electric vehicles.

The motor-driving secondary batteries are required to have very high output performance and high energy as compared to consumer lithium-ion secondary batteries for mobile phones, notebook computers etc. Among all batteries, attentions are being given to lithium-ion secondary batteries having relatively high theoretical energy. The development of the lithium-ion secondary batteries has been pursued rapidly at present.

In general, the lithium-ion secondary battery includes a positive electrode in which a positive electrode active material is applied to both sides of a positive electrode collector with the use of a binder etc. and a negative electrode in which a negative electrode active material is applied to both sides of a negative electrode collector with the use of a binder etc. The positive and negative electrodes are connected to each other via an electrolyte layer and accommodated in a battery case.

Conventionally, carbon/graphite materials are used for negative electrodes of lithium-ion secondary batteries in terms of charge/discharge cycle lifetime and cost advantage. However, the carbon/graphite-based negative electrode active materials perform charge/discharge operation by absorption and desorption of lithium ions to and from graphite crystals and thus have the drawback that these negative electrode active materials cannot obtain a charge/discharge capacity higher than or equal to 372 mAh/g, that is, the theoretical capacity of the maximum lithium intercalation compound $LiC_6$. It is difficult for the carbon/graphite-based negative electrode active materials to secure a satisfactory level of capacity and energy density for practical use in vehicles.

On the other hand, materials capable of alloying with Li are expected as negative electrode materials for vehicle uses due to the fact that batteries using these Li alloying materials improve in energy density as compared to those using conventional carbon/graphite-based negative electrode active materials. In the case of Si material, for example, there occurs absorption and desorption of 4.4 mol of lithium ions per 1 mol of Si during charge/discharge operation as indicated in the following reaction scheme (1). The theoretical capacity of $Li_{22}Si_5$ ($=Li_{4.4}Si$) reaches 2100 mAh/g. The Si material has an initial capacity 3200 mAh/g per weight.

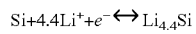
(1)

In the lithium-ion secondary battery, however, the Li-alloying negative electrode material shows a high degree of expansion and contraction during charge/discharge operation. While the graphite material expands about 1.2 times in volume by absorption of Li ions, the Si material shows a larger volume change (i.e. expands about 4 times in volume) by transition from amorphous to crystalline phase during alloying of Si with Li. This results in a deterioration of electrode cycle lifetime. Further, the Si material has a trade-off relationship between capacity and cycle durability so that it is difficult to improve the cycle durability of the Si material while securing the high capacity of the Si material.

In order to solve the above problems, there has been proposed "alloying" of Si by addition of various metal elements" as the technique for improving the cycle lifetime of Si as the negative electrode active material. However, many proposals (such as inventions) about alloying of Si relate to composite materials in which Si is mixed with other metal elements. Many of these Si composite materials become much lower in capacity than Si. These Si composite materials also significantly decrease in initial charge/discharge efficiency with increase in secondary phase content. Further, it is known that the alloyed Si negative electrode active materials decrease in initial charge/discharge efficiency with increase in metal doping concentration. For example, there has been proposed a negative electrode active material for a lithium-ion secondary battery containing an amorphous alloy having a composition represented by the formula: $Si_xM_yAl_z$ (see, for example, Patent Document 1). In the formula, x, y and z represent atomic percent values and satisfy the following conditions: $x+y+z=100$, $x≥55$, $y<22$ and $z>0$; and M represents at least one metal selected from the group consisting of Mn, Mo, Nb, W, Ta, Fe, Cu, Ti, V, Cr, Ni, Co, Zr and Y. It is described in paragraph [0018] of Patent Document 1 that the amorphous alloy-containing negative electrode active material can attain not only a high capacity but also good cycle lifetime by minimizing the content of the metal M.

By the use of the amorphous alloy $Si_xM_yAl_z$ of Patent Document 1 in the negative electrode, it may be possible for the lithium-ion secondary battery to attain high cycle performance. Even in this case, however, the initial capacity and cycle capacity of the lithium-ion secondary battery are not at a sufficiently high level.

As mentioned above, the electrodes using the alloyed Si negative electrode active materials of Patent Document 1 etc. and batteries using the same make improvements in cycle durability but face the problem of decreases in effective battery capacity due to low initial charge/discharge efficiency. In addition, very difficult adjustments are required in actual battery production due to increase in difference between positive and negative electrode characteristics. Although the "charge/discharge capacity" and "cycle durability" are specifically noted as the performance required of the negative electrode active material, not only the "charge/discharge capacity" and "cycle durability" but also the "initial charge/discharge efficiency" are very important parameters for the actual battery applications. However, there has been no negative electrode active material that attains good balance between these electrochemical characteristics.

PRIOR ART DOCUMENTS

Patent Documents

Patent Document 1: JP-T-2009-517850

SUMMARY OF THE INVENTION

It is therefore an object of the present invention to provide a negative electrode active material for electrical devices such as lithium-ion batteries (hereinafter sometimes simply referred to as "negative electrode active material"), capable of attaining well-balanced characteristics to combine high cycle durability with high initial charge/discharge efficiency.

The present inventors have selected, as a negative electrode active material, one suitable combination of Si and two or more additive elements mutually complementary to Si through a multitude of trials and errors and excessive experiments using enormous combinations of Si and metal and non-metal elements. In other words, the present inventors have found it is possible to solve the above-mentioned problems by the use of a Si—C—Al ternary alloy in which a Si active material and first and second additive elements C and Al are mutually complementary to each other and satisfy a specific Si—C—Al composition ratio range. The present invention is based on this finding.

Namely, the object of the present invention can be achieved by a negative electrode active material for an electrical device containing an alloy having a composition represented by the formula: $Si_xC_yAl_z$. In the composition formula: $Si_xC_yAl_z$, x, y and z represent mass percent values and satisfy the following conditions.

$$x+y+z=100$$

$$36 \leq x < 100$$

$$0 < y < 64$$

$$0 < z < 64$$

In the negative electrode active material for the electrical device according to the present invention, the specific content of C as the first additive element in the alloy of the above composition performs the function of, at the time of alloying of Si with Li, preventing transition from amorphous to crystalline phase so as to obtain improvement in cycle lifetime. Furth, the specific content of Al as the second additive element in the alloy of the above composition performs the function of, at the time of alloying of Si with Li, preventing the capacity of the electrode from decreasing with increase in the concentration of the first additive element in the negative electrode active material for the electrical device. As a result of combination of these functions, it is possible to obtain significant, valuable effects that the negative electrode active material containing the alloy of the above composition can attain well-balanced characteristics such as a high capacity e.g. high initial capacity, high charge/discharge efficiency and high cycle durability.

DESCRIPTION OF EMBODIMENTS

Figure 1:
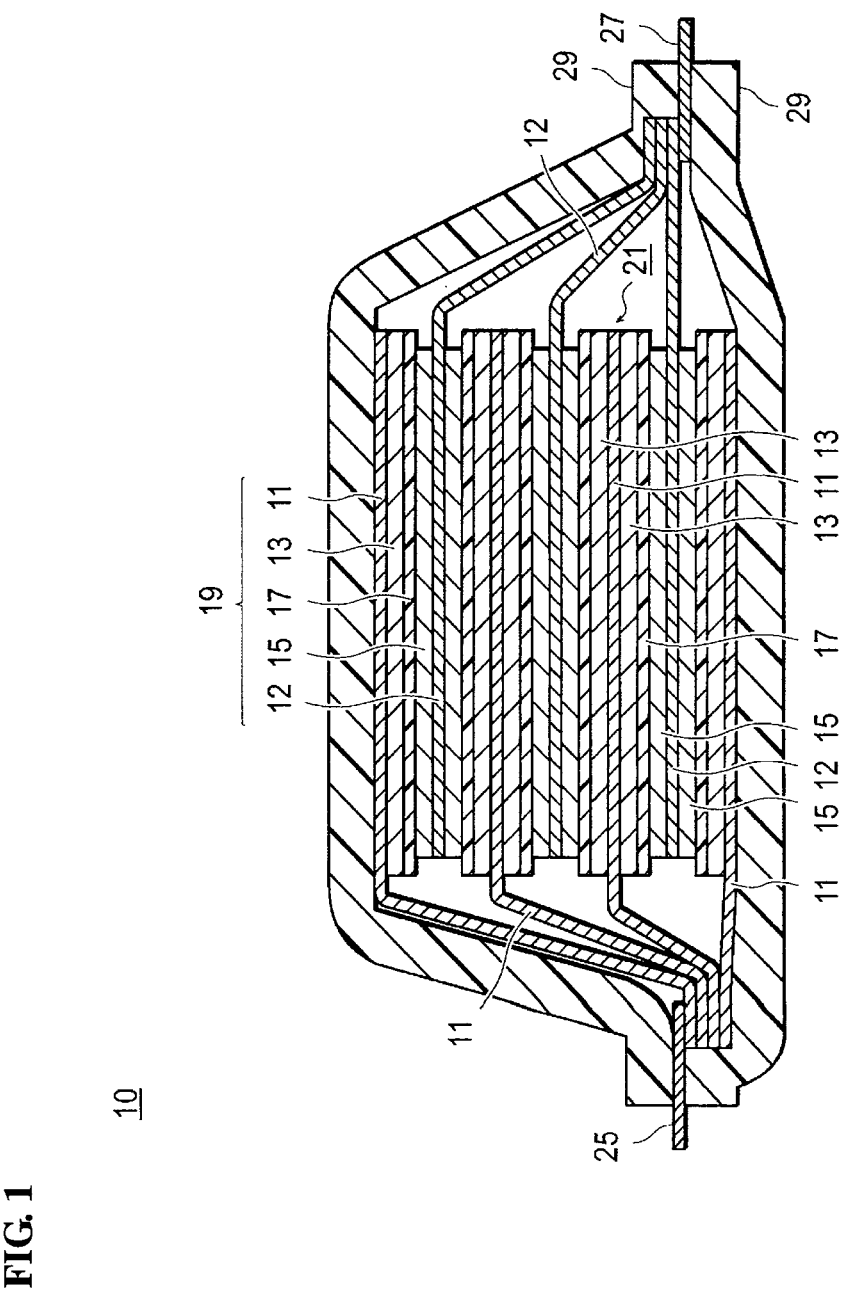
FIG. 1 is a schematic cross-section view of a stacked flat non-bipolar lithium-ion secondary battery as a typical embodiment of an electrical device according to the present invention.

Hereinafter, exemplary embodiments of a negative electrode active material for electrical devices and an electrical device using the same according to the present invention will be described below with reference to the drawings. It is herein noted that the technical scope of the present invention should be defined based on the description of claims and should not be limited to the following embodiments. In the drawings, like parts and portions are designated by like reference numerals to omit repeated explanations thereof; and the dimensions of the respective parts and portions may be exaggerated for purposes of illustration and may be different from the actual dimensions.

The basic structure of the electrical device to which the negative electrode active material according to the present invention is applicable will be first explained below with reference to the drawings. The following embodiment refers to a lithium-ion battery as one example of the electrical device.

More specifically, a negative electrode active material for a lithium-ion battery as one typical embodiment of the negative electrode active material for the electrical device according to the present invention, as well as a negative electrode and a lithium-ion battery using the negative electrode active material are advantageous in that it is possible to provide a cell (unit cell) with a high voltage, high energy density and high output density. Thus, the present embodiment can suitably be applied to a lithium-ion secondary battery as power sources for vehicles because the negative electrode and the lithium-ion battery using the negative electrode active material according to the present embodiment are superior for use in driving power sources and auxiliary power sources for vehicles. The present embodiment can also satisfactorily be applied to a lithium-ion secondary battery for mobile appliances such as mobile phones.

There is no particular limitation on the structure and form of the lithium-ion battery according to the present embodiment as long as the after-mentioned negative electrode active material is used in the lithium-ion battery.

As to the usage form of the lithium-ion battery, for example, the lithium-ion battery can be either a lithium-ion primary battery or a lithium-ion secondary battery. Because of its high cycle durability, the lithium-ion battery is preferably a lithium-ion secondary battery for use as driving power sources of vehicles or for use in mobile appliances such as mobile phones etc.

As to the structure and shape of the lithium-ion battery, the lithium-ion battery can be of any known structure and shape such as stacked (flat) structure, winding (cylindrical) structure etc. The adoption of stacked (flat) battery structure makes it possible to secure long-term battery reliability by simple sealing technique e.g. thermocompression bonding and provides advantages in cost, workability etc.

As to the electrical connection (electrode configuration) inside the lithium-ion battery, the lithium-ion battery can be of non-bipolar type (internal parallel connection type) or bipolar type (internal series connection type).

Further, the lithium-ion battery can be provided with any known type of electrolyte layer in the form of a solution electrolyte battery using a solution electrolyte e.g. non-aqueous electrolyte solution in the electrolyte layer or a polymer battery using a polymer electrolyte in the electrolyte layer. The polymer battery is classified into a gel electrolyte battery using a polymer gel electrolyte (sometimes simply referred to as "gel electrolyte") and a solid polymer (all solid state) battery using a polymer solid electrolyte (sometimes simply referred to as "polymer electrolyte").

In the following description, the lithium-ion battery of non-bipolar (internal parallel connection type) using the negative electrode active material according to the present embodiment will be described briefly with reference to the drawings. The technical scope of the lithium-ion battery according to the present embodiment is not limited to the following description.

<Overall Battery Structure>

FIG. 1 is a schematic section view showing the overall structure of the flat (stacked) lithium-ion secondary battery sometimes simply referred to as "stacked battery") as the typical embodiment of the electrical device according to the present invention.

As shown in FIG. 1, stacked battery 10 according to the present embodiment includes substantially rectangular power generating element 21, which actually undergoes a charge/discharge reaction, sealed in a package of laminate film sheets 29. Power generating element 21 has positive electrodes in each of which positive electrode active material layers 13 are arranged on both sides of positive electrode collector 11, electrolyte layers 17 and negative electrodes in each of which negative electrode active material layers 15 are arranged on both sides of negative electrode collector 12. The negative electrodes, electrolyte layers 17 and the positive electrodes are alternately stacked together in such a manner that either one of positive electrode active material layers 13 and its adjacent one of negative electrode active material layers 15 face each other via electrolyte layer 17.

These adjacently located positive electrode active material layer 13, electrolyte layer 17 and negative electrode active material layer 15 constitute cell (unit cell) 19. It can thus be said that stacked battery 10 has a structure in which a plurality of cells (unit cells) 19 are stacked and electrically connected in parallel as shown in FIG. 1. Outermost positive electrode collectors are located at outermost layers of power generating element 21. Although positive electrode active material layer 13 is formed only on one side of the outermost positive electrode collector, positive electrode active material layers 13 may be formed on both sides of the outermost positive electrode collector. Namely, it is feasible to adopt the collector having active material layers on both sides as it is as the outermost positive electrode collector, rather than to form the dedicated outermost collector having active material layer on one side. The arrangement of the positive and negative electrodes may be inverted from that of FIG. 1 such that outermost negative electrode collectors each having negative electrode active material layer on one side are located as outermost layers of power generating element 21.

Positive and negative electrode collector plates 25 and 27 are joined to positive and negative electrode collectors 11 and 12, respectively, for electrical connection to the electrodes (positive and negative electrodes). Each of positive and negative electrode collector plates 25 and 27 is led out from between end portions of laminate film sheets 29. Herein, positive and negative collector plates 25 and 27 can be joined by ultrasonic welding, resistance welding etc. via positive and negative electrode leads (not shown) as needed.

The above-described lithium ion secondary battery is characterized by its negative electrode active material composition. Hereinafter, the main battery parts including the negative electrode active material will be described below.

(Active Material Layer)

Active material layer 13, 15 includes an active material and optionally an additive or additives.

(Positive Electrode Active Material Layer)

Positive electrode active material layer 13 includes a positive electrode active material.

[Positive Electrode Active Material]

As the positive electrode active material, there can be used a lithium-transition metal composite oxide, a lithium-transition metal phosphate compound, a lithium-transition metal sulfate compound, a solid solution system, a ternary system, a NiMn system, a NiCo system, a spinel Mn system etc. Examples of the lithium-transition metal composite oxide include $LiMn_2O_4$, $LiCoO_2$, $LiNiO_2$, $Li(Ni, Mn, Co)O_2$, $Li(Li, Ni, Mn, Co)O_2$, $LiFePO_4$, and those obtained by partially substituting these transition metals with other elements. Examples of the solid solution system include a solid solution of $LiMO_2$ and $Li_2NO_3$, $xLiMO_2 \cdot (1-x)Li_2NO_3$ (where $0<x<1$; M is one or more kinds of transition metals having an average oxidation state of 3+; and N is one or more kinds of transition metals having an average oxidation state of 4+) and $LiRO_2$—$LiMn_2O_4$ (where R is a transition metal element such as Ni, Mn, Co, or Fe). Examples of the ternary system include a nickel-cobalt-manganese (composite) positive electrode active material. Examples of the spinel Mn system include $LiMn_2O_4$. Examples of the NiMn system include $LiNi_{0.5}Mn_{1.5}O_4$. Examples of the NiCo system include $Li(NiCo)O_2$. In some cases, two or more kinds of positive electrode active materials may be used in combination.

Among others, lithium-transition metal composite oxide and solid solution system are preferred as the positive electrode active material in terms of capacity and output performance. It is needless to say that there can be used any other positive electrode active materials. In the case where the active materials have different optimum particle sizes to exhibit their respective specific effects, it is feasible to blend particles of such optimum particle sizes and is not always necessary to uniformize the particle sizes of all of the active materials.

There is no particular limitation on the average particle size of the positive electrode active material in positive electrode active material layer 13. In terms of high output performance, the average particle size of the positive electrode active material is preferably 1 to 20 µm. In the present specification, the term "particle size" refers to a maximum distance between two arbitrary points on an outline of an active material particle (observed surface) observed by observation means such as a scanning electron microscope (SEM) and a transmission electron microscope (TEM); and the term "average particle size" refers to an average value of particle sizes of active material particles observed in several to several tens of fields of view by observation means such as a scanning electron microscope (SEM) and a transmission electron microscope (TEM). The particle size and average particle size of the other components are defined in the same manner.

The positive electrode (positive electrode active material layer) can be formed by ordinary slurry application (coating) process or by kneading, sputtering, vapor deposition, CVD, PVD, ion plating or thermal spraying.

(Negative Electrode Active Material Layer)

Negative electrode active material layer 15 includes a negative electrode active material containing an alloy represented by the composition formula: $Si_xC_yAl_z$ according to the present embodiment. The use of the negative electrode active material according to the present embodiment makes it possible to provide good electrodes with a high capacity, high cycle durability and high initial charge/discharge efficiency for the lithium-ion secondary battery. The use of such negative electrode including the negative electrode active material according to the present embodiment makes it possible to impart excellent battery characteristics such as a high capacity and high cycle durability to the lithium-ion secondary battery.

[Negative Electrode Active Material]

The negative electrode active material according to the present embodiment is characterized in that the alloy represented by the composition formula: $Si_xC_yAl_z$ is contained in the negative electrode active material. In the composition formula: $Si_xC_yAl_z$, x, y and z each represent mass percent values and satisfy the following conditions.

$x+y+z=100$ $36 \leq x < 100$ $0 < y < 64$ $0 < z < 64$

Figure 5:
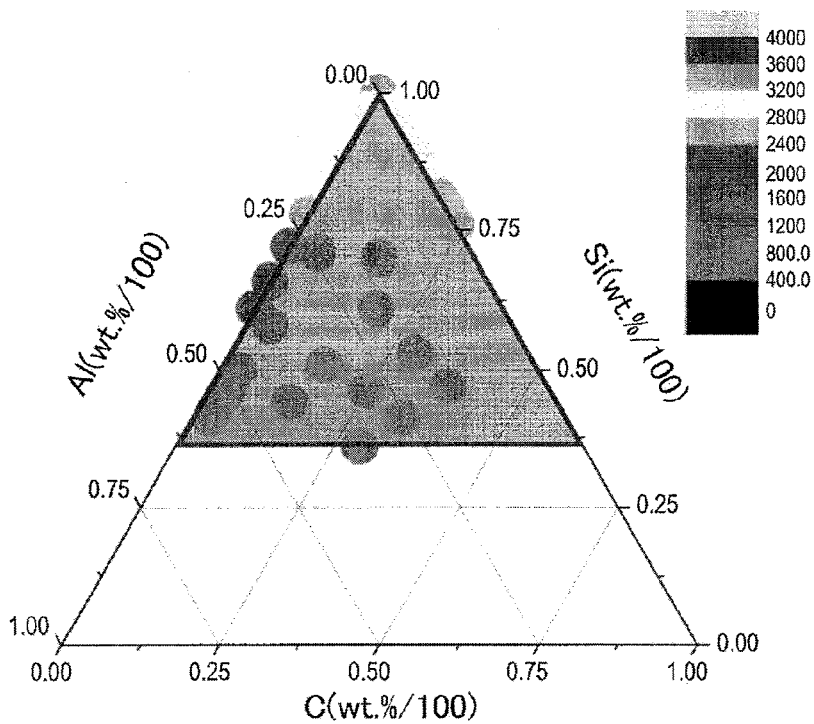
FIG. 5 is a diagram in which the composition range of the Si—C—Al alloy samples of Example 1 where Si+C+Al (each in units of wt %/100)=1.00; $0.36 \leq Si$ (wt %/100)<1.00; $0 < C$ (wt %/100)<0.64; and $0 < Al$ (wt %/100)<0.64 is encircled and color-coded (shaded) on the Si—C—Al ternary alloy composition diagram of FIG. 3.

In the present embodiment, C is selected as a first additive element to prevent amorphous-to-crystalline phase transition at the time of alloying with Li and thereby obtain improvement in cycle lifetime; and Al is selected as a second additive element to prevent the capacity of the electrode from decreasing with increase in the concentration of the first additive element. Further, the composition ratio of the high-capacity element Si and these additive elements is controlled to within the appropriate range. The reason for preventing the occurrence of amorphous-to-crystalline phase transition is that the Si material shows a larger volume change (i.e. expands about 4 times in volume) by amorphous-to-crystalline phase transition at the time of alloying of Si with Li whereby the particles are broken to lose the function of the active material. It is possible to avoid breakage of the particles, maintain the function of the active material (high capacity e.g. high initial capacity and high initial charge/discharge efficiency) and obtain improvement in cycle lifetime by preventing the occurrence of amorphous-to-crystalline phase transition. Thus, the Si alloy-containing negative electrode active material attains well-balanced characteristics such as high capacity e.g. high initial capacity, high initial charge/discharge efficiency and high cycle durability when the first and second additive elements are selected and controlled in such a manner that the composition ratio of the high-capacity element Si and the selected first and second additive elements falls within the specific range. More specifically, when the composition ratio of the Si—C—Al alloy falls within the range encircled by the solid thick line (inside the triangle) in FIG. 5, the Si alloy-containing negative electrode active material attains a significantly high capacity that can hardly be attained by conventional carbon-based negative electrode active material. The Si alloy-containing negative electrode active material also attains a higher capacity e.g. high initial capacity (1113 mAh/g or higher) and a higher initial charge/discharge efficiency (94% or higher) than those of conventional Sn-based alloy negative electrode active material. Although conventional Sn-based negative electrode active material and multi metal alloy negative electrode active material of Patent Document 1 are high in capacity but poor in cycle durability due to the trade-off relationship between capacity and cycle durability, the Si alloy-containing negative electrode active material attains a higher level of cycle durability than those of these conventional negative electrode active materials.

Figure 6:
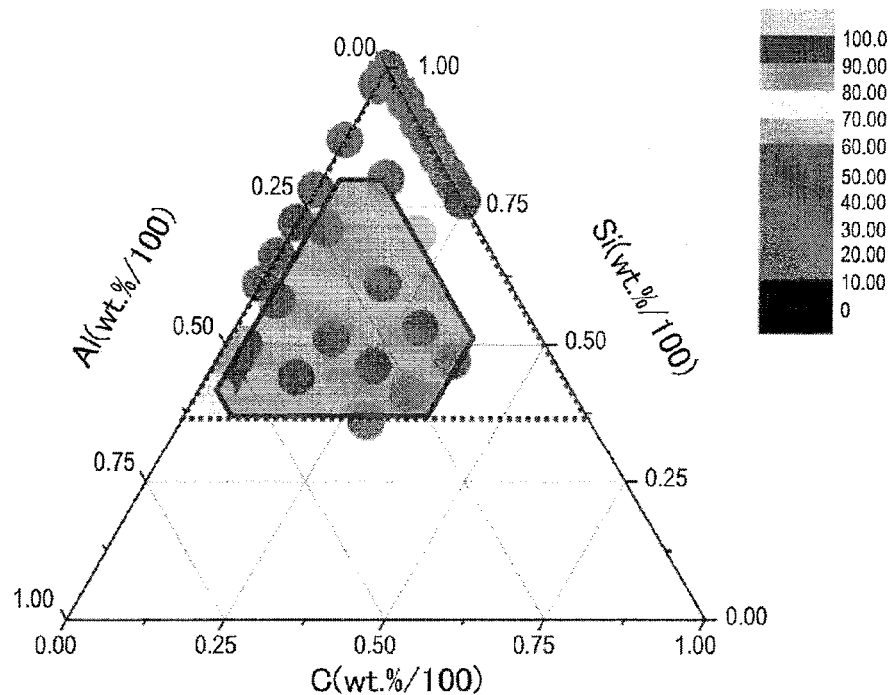
FIG. 6 is a diagram in which the preferable composition range of the Si—C—Al alloy samples of Example 1, where Si+C+Al (each in units of wt %/100)=1.00; $0.36 \leq Si$ (wt %/100)$\leq 0.80$; $0.03 \leq C$ (wt %/100)$\leq 0.37$; and $0.10 \leq Al$ (wt %/100)$\leq 0.56$, is encircled and color-coded (shaded) on the Si—C—Al ternary alloy composition diagram of FIG. 4.

It is preferable in the negative electrode active material according to the present embodiment that the values x, y and z satisfy the following conditions in the composition formula:

$Si_xC_yAl_z.$ $x+y+z=100$ $36 \leq x \leq 80$ $3 \leq y \leq 37$ $10 \leq z \leq 56$ The Si alloy-containing negative electrode active material attains excellent characteristics when the composition ratio of the high-capacity element Si, the first additive element C and the second additive element Al falls within the above specific range. More specifically, when the composition ratio of the Si—C—Al alloy falls within the range encircled by the solid thick line (inside the hexagon) in FIG. 6, the Si alloy-containing negative electrode active material attains a significantly high capacity that can hardly be attained by conventional carbon-based negative electrode active material. The Si alloy-containing negative electrode active material also attains a higher capacity e.g. higher initial capacity (1113 mAh/g or higher) and a higher initial charge/discharge efficiency (94% or higher) than those of conventional Sn-based alloy negative electrode active material. This composition range (inside the hexagon encircled by the solid thick line in FIG. 6) corresponds to the range where high capacity e.g. high initial capacity and high charge/discharge efficiency were actually realized in samples 1 to 18 of Example 1 as will be explained later. Although conventional Sn-based negative electrode active material and multi metal alloy negative electrode active material of Patent Document 1 are high in capacity but poor in cycle durability due to the trade-off relationship between capacity and cycle durability, the Si alloy-containing negative electrode active material attains a higher level of cycle durability than those of these conventional negative electrode active materials.

It is more preferable in the negative electrode active material according to the present embodiment that the values x, y and z satisfy the following conditions in the composition formula:

$Si_xC_yAl_z$.

$x+y+z=100$ $41 \leq x \leq 71$ $3 \leq y \leq 29$ $10 \leq z \leq 56$

Figure 3:
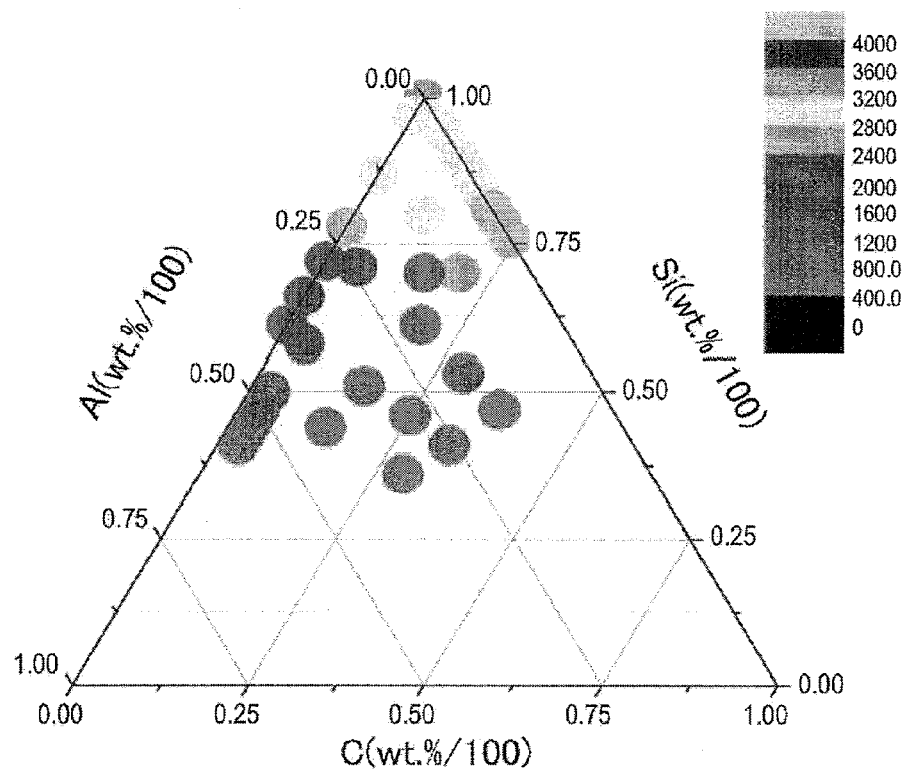
FIG. 3 is a composition diagram of a Si—C—Al ternary alloy, in which Si—C—Al alloy samples (Sample Nos. 1 to 33) of Example 1 are plotted by color-coding (shading) the 1st-cycle discharge capacity values (mAh/g) of batteries using the respective samples.

The Si alloy-containing negative electrode active material attains more excellent characteristics when the composition ratio of the high-capacity element Si, the first additive element C and the second additive element Al falls within the above specific range. More specifically, when the composition ratio of the Si—C—Al alloy falls within the range encircled by the solid thick line (inside the hexagon) in FIG. 7, the Si alloy-containing negative electrode active material attains a significantly high capacity that can hardly be attained by conventional carbon-based negative electrode active material. The Si alloy-containing negative electrode active material also attains a higher capacity e.g. higher initial capacity (1133 mAh/g or higher) and a higher initial charge/discharge efficiency (94% or higher) than those of conventional Sn-based alloy negative electrode active material. Although conventional Sn-based negative electrode active material and multi metal alloy negative electrode active material of Patent Document 1 are high in capacity but poor in cycle durability due to the trade-off relationship between capacity and cycle durability, the Si alloy-containing negative electrode active material attains a much higher level of cycle durability than those of these conventional negative electrode active materials. For example, the Si alloy-containing negative electrode active material exhibits a high discharge capacity retention of 64% or higher at the 50th cycle. This composition range (inside the hexagon encircled by the solid thick line in FIG. 7) corresponds to the range where high capacity e.g. high initial capacity, high charge/discharge efficiency and high cycle durability were actually realized with good balance among samples 1 to 18 of Example 1. The selection of such a composition range enables high-performance Si alloy-containing negative electrode active material (see TABLE 1 and FIGS. 3, 4 and 7).

It is still more preferable in the negative electrode active material according to the present embodiment that the values x, y and z satisfy the following conditions in the composition formula:

$Si_xC_yAl_z$.

$x+y+z=100$ $41 \leq x \leq 71$ $3 \leq y \leq 29$ $15 \leq z \leq 56$

The Si alloy-containing negative electrode active material attains still more excellent characteristics when the composition ratio of the high-capacity element Si, the first additive element C and the second additive element Al falls within the above specific range. More specifically, when the composition ratio of the Si—C—Al alloy falls within the range encircled by the solid thick line (inside the small hexagon) in FIG. 8, the Si alloy-containing negative electrode active material attains a significantly high capacity that can hardly be attained by conventional carbon-based negative electrode active material. The Si alloy-containing negative electrode active material also attains a higher capacity such as higher initial capacity (1133 mAh/g or higher) and a higher initial charge/discharge efficiency (94% or higher) than those of conventional Sn-based alloy negative electrode active material. Although conventional Sn-based negative electrode active material and multi metal alloy negative electrode active material of Patent Document 1 are high in capacity but poor in cycle durability due to the trade-off relationship between capacity and cycle durability, the Si alloy-containing negative electrode active material attains a much higher level of cycle durability than those of these conventional negative electrode active materials. For example, the Si alloy-containing negative electrode active material exhibits a higher discharge capacity retention of 74% or higher at the 50th cycle. This composition range (inside the small hexagon encircled by the solid thick line in FIG. 8) corresponds to the range where high capacity e.g. high initial capacity, high charge/discharge efficiency and higher cycle durability were actually realized with very good balance among samples 1 to 18 of Example 1. The selection of such a composition range enables higher-performance Si alloy-containing negative electrode active material (see TABLE 1 and FIGS. 3, 4 and 7).

It is especially preferable in the negative electrode active material according to the present embodiment that the values x, y and z satisfy the following conditions in the composition formula: $Si_xC_3Al_z$.

$x+y+z=100$ $43 \leq x \leq 61$ $3 \leq y \leq 29$ $20 \leq z \leq 54$

The Si alloy-containing negative electrode active material attains most excellent characteristics when the composition ratio of the high-capacity element Si, the first additive element C and the second additive element Al falls within the above specific range. More specifically, when the composition ratio of the Si—C—Al alloy falls within the range encircled by the solid thick line (inside the smallest hexagon) in FIG. 9, the Si alloy-containing negative electrode active material attains a significantly high capacity that can hardly be attained by conventional carbon negative electrode active material. The Si alloy-containing negative electrode active material also attains a higher capacity e.g. higher initial capacity (1192 mAh/g or higher) and a higher initial charge/discharge efficiency (97% or higher) than those of conventional Sn-based alloy negative electrode active material. Although conventional Sn-based negative electrode active material and multi metal alloy negative electrode active material of Patent Document 1 are high in capacity but poor in cycle durability due to the trade-off relationship between capacity and cycle durability, the Si alloy-containing negative electrode active material attains a much higher level of cycle durability than those of these conventional negative electrode active materials. For example, the Si alloy-containing negative electrode active material exhibits a higher discharge capacity retention of 74% or higher at the 50th cycle. This composition range (inside the smallest hexagon encircled by the solid thick line in FIG. 9) corresponds to the range where higher capacity e.g. higher initial capacity, high charge/discharge efficiency and higher cycle durability were actually realized with the best balance (best mode) among samples 1 to 18 of Example 1. The selection of such a composition range enables particularly high-performance Si alloy-containing negative electrode active material (see TABLE 1 and FIGS. 3, 4 and 7). In contrast, it is difficult for binary alloys in which either one of the additive elements is not contained in the tertiary alloy $Si_xC_yAl_z$ (i.e. Si—Al alloy where y=0 and Si—C alloy where z=0) and for Si elementary substance to attain a high initial charge/discharge efficiency and high cycle performance. The Si binary alloy and Si elementary substance are not sufficient in initial charge/discharge efficiency and are low (deteriorate) in cycle performance. In the Si binary alloy and Si elementary substance, higher capacity e.g. higher initial capacity, high initial charge/discharge efficiency and higher cycle durability cannot be realized with the best balance in the same manner as mentioned above.

Figure 2:
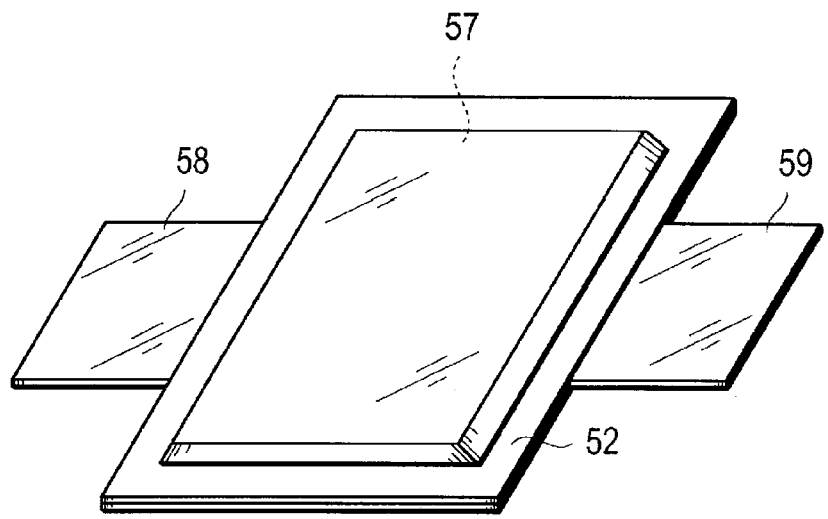
FIG. 2 is a perspective view showing the appearance of the stacked flat lithium-ion secondary battery as the typical embodiment of the electrical device according the present invention.
Figure 4:
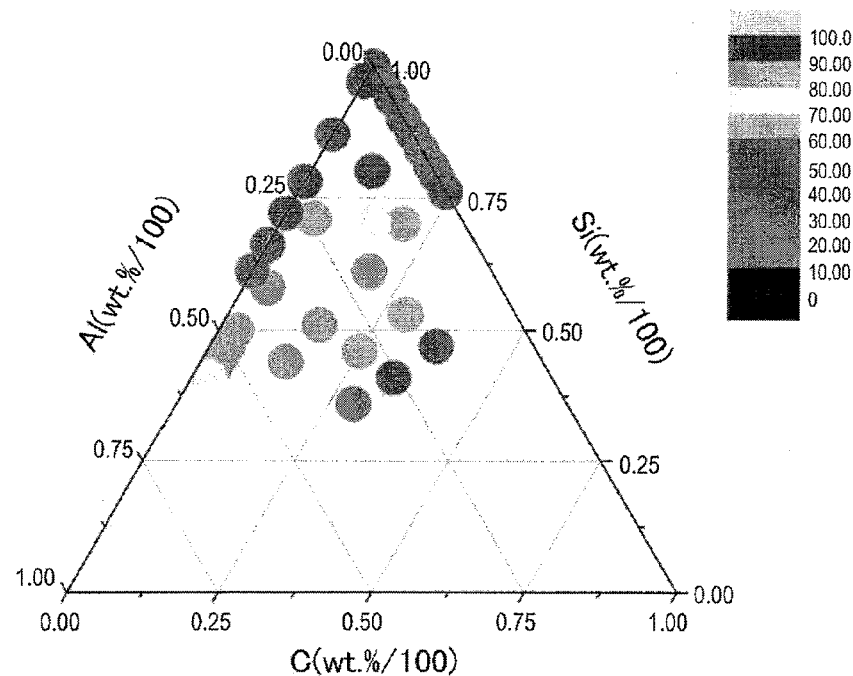
FIG. 4 is a composition diagram of a Si—C—Al ternary alloy, in which the Si—C—Al samples (Sample Nos. 1 to 33) of Example 1 are plotted by color-coding (shading) the 50th-cycle discharge capacity retention values (%) of the batteries using the respective samples.

In the negative electrode active material, the ternary alloy $Si_xC_yAl_z$ is amorphous in a newly produced state (uncharged state) when the composition ratio of the ternary alloy is in the above preferable range. When the negative electrode active material is used in the lithium-ion secondary battery, the lithium-ion secondary battery has the remarkable property of preventing a large volume change caused by amorphous-to-crystalline phase transition at the time of alloying of Si with Li during charge/discharge operation. It is difficult for other ternary and quaternary alloys such as $Si_xM_yAl_z$ of Patent Document 1 to attain high cycle performance, in particular, high discharge capacity retention at the 50th cycle. These ternary and quaternary alloys face a large problem of rapid decrease (deterioration) in cycle performance. More specifically, the ternary and quaternary alloys such as $Si_xM_yAl_z$ of Patent Document 1 have a considerably higher initial capacity (1st-cycle discharge capacity) than that of conventional carbon-based negative electrode active material (theoretical capacity: 372 mAh/g) and than that of conventional Sn-based negative electrode active material (theoretical capacity: about 600 to 700 mAh/g). The cycle performance of the ternary and quaternary alloys such as $Si_xM_yAl_z$ of Patent Document 1 is considerably poor and unsatisfactory as compared to the 50th-cycle discharge capacity retention (about 60%) of the Sn-based negative electrode active material. Namely, the ternary and quaternary alloys such as $Si_xM_yAl_z$ of Patent Document 1 are not suitable for practical use due to the trade-off imbalance between capacity and cycle performance. For example, the quaternary alloy $Si_{62}Al_{18}Fe_{16}Zr_4$ of Example 1 of Patent Document 1 attains a high initial capacity of about 1150 mAh/g as shown in FIG. 2, of Patent Document 1. It is however indicated that the cycling capacity is only about 1090 mAh/g after 5 to 6 cycles in Example 1 of Patent Document 1. It is thus apparent from FIG. 2 that, in Example 1 of Patent Document 1, the discharge capacity retention is largely reduced to about 95% at the 5th or 6th cycle, that is, reduced by substantially 1% per cycle. In view of such a fact, it is assumed that the discharge capacity retention is reduced by about 50% at the 50th cycle (i.e. the discharge capacity retention is reduced to about 50%) in Example 1 of Patent Document 1. Similarly, the ternary alloy $Si_{55}Al_{29.3}Fe_{15.7}$ of Example 2 of Patent Document 1 has a high initial capacity of about 1430 mAh/g as shown in FIG. 4 of Patent Document 1. It is however indicated that the cycling capacity is largely reduced to about 1300 mAh/g after only 5 to 6 cycles. It is thus apparent from FIG. 4 that, in Example 2 of Patent Document 1, the discharge capacity retention is rapidly reduced to about 90% at the 5th or 6th cycle, that is, reduced by substantially 2% per cycle. In view of such a fact, it is assumed that the discharge capacity retention is reduced by about 100% at the 50th cycle (i.e. the discharge capacity retention is reduced to about 0%). Although there is no description in Patent Document 1 about the initial capacity of the quaternary alloy $Si_{60}Al_{20}Fe_{12}Ti_8$ of Example 3 and the quaternary alloy $Si_{62}Al_{16}Fe_{14}Ti8$ of Example 4, it is indicated in Table 2 of Patent Document 1 that the cycling capacity is reduced to as low as 700 to 1200 mAh/g after only 5 to 6 cycles in each example. As the 5th- or 6th-cycle discharge capacity retention of Example 3 of Patent Document 1 is equal to or lower than those of Examples 1 and 2 of Patent Document 1, it is assumed that the discharge capacity retention is substantially reduced by 50% to 100% at the 50th cycle (i.e. the discharge capacity retention is reduced to about 50% to 0%). The alloy compositions of Patent Document 1 are described in units of atomic ratio. By conversion of the atomic ratio to the mass ratio as in the present embodiment, it is considered that the alloy compositions containing about 20 mass % of Fe as the first additive element are disclosed in Examples of Patent Document 1.

In the case of using the conventional ternary and quaternary alloys of Patent Document 1 etc. in batteries, the thus-obtained batteries have the problems of reliability and safety because it is difficult to attain a sufficient level of cycle performance for practical use in the field where cycle durability is strongly required such as for use in vehicles. These batteries are difficult to put into practical use. On the other hand, the negative electrode active material using the ternary alloy $Si_xC_yAl_z$ according to the present embodiment has a high discharge capacity retention at the 50th cycle as high cycle performance (see FIGS. 7 to 9). Further, the initial capacity (1st-cycle discharge capacity) of the negative electrode active material using the ternary alloy $Si_xC_yAl_z$ according to the present embodiment is much higher than that of conventional carbon-based negative electrode active material and is also higher than that of conventional Sn-based negative electrode active material (see TABLE 1 and FIG. 3). The negative electrode active material using the ternary alloy $Si_xC_yAl_z$ according to the present embodiment also has a high initial charge/discharge efficiency. It is therefore possible to provide the negative electrode active material with well-balanced characteristics. In short, there has been found the negative electrode active martial using the alloy capable of attaining a high level of capacity, cycle durability and initial charge/discharge efficiency with good balance even though high capacity and cycle durability cannot be realized by the conventional carbon-based and Sn-based negative electrode active materials and the conventional ternary and quaternary alloys of Patent Document 1 etc. due to the trade-off relationship. In particular, it has been found that the desired object can be achieved by selecting two additive elements C and Al from various candidates of one or more additive elements and by selecting the specific composition ratio (composition range) of the high-capacity element Si and these additive elements. This results in the significant effects that the lithium-ion secondary battery can be obtained with the best balance between higher capacity e.g. initial capacity, high initial charge/discharge efficiency and higher cycle durability.

The negative electrode active material will be explained in more detail below.

(1) Total Mass % of Alloy

The total mass % of the alloy of the composition formula: $Si_xC_yAl_z$ is x+y+z=100 (where x, y, and z each represent mass % values). In other words, the alloy needs to be of Si—C—Al ternary system. The alloy is not a binary alloy, a ternary alloy of different composition or a quaternary alloy or multi metal alloy in which a different element or elements are added. However, the alloy may contain a very small amount of metal element etc. as impurities unavoidable in production (a very small amount of metal element etc. that does not affect the effects of the present embodiment). In the present embodiment, it suffices to contain at least one kind of alloy of $Si_xC_y$-$Al_z$ in negative electrode active material layer 15. Two or more kinds of alloys of different compositions may be used in combination.

(2) Mass % of Si in Alloy

The value x of the composition formula: $Si_xC_yAl_z$, that is, the mass % of Si is in the range of $36 \le x < 100$, preferably $36 \le x \le 80$, more preferably $41 \le x \le 71$, still more preferably $43 \le x \le 61$. The higher the mass % of the high-capacity element Si (value x) in the alloy, the higher the capacity of the Si alloy-containing negative electrode active material. When the value x is in the range of $36 \le x \le 100$, the Si alloy-containing negative electrode active material attains a significantly high capacity that can hardly be attained by conventional carbon-based negative electrode active material. The Si alloy-containing negative electrode active material also attains a higher capacity than that of Sn-based negative electrode active material (see FIG. 5). Further, the Si alloy-containing negative electrode active material attains a high discharge capacity retention at the 50th cycle (cycle durability) when the value x is in the range of $36 \le x < 100$.

The mass % of the high-capacity element Si (value x) in the alloy is preferably in the range of $36 \le x \le 80$ in order for the Si alloy-containing negative electrode active material to ensure good balance of high cycle performance (high 50th-cycle discharge capacity retention) with high initial capacity and high charge/discharge efficiency. The Si alloy-containing negative electrode active material attains excellent characteristics (high capacity and cycle durability, which are in trade-off relationship in conventional alloy negative electrode active materials, and high charge/discharge efficiency) by controlling not only the content of the high-capacity element Si but also the contents of the first additive element C and the second additive element Al to within the respective preferable ranges. There is a tendency that that the Si alloy-containing negative electrode active martial shows increase in capacity but decrease in cycle durability and charge/discharge efficiency as the numerical mass % value (value x) of the high capacity element Si in the alloy increases. It is however advantageously possible to attain a high capacity as well as high charge/discharge efficiency and high discharge capacity retention when the mass % of the high-capacity element Si (value x) is in the range of $36 \le x \le 80$.

The mass % of the high-capacity element Si (value x) in the alloy is more preferably in the range of $41 \le x \le 71$ in order for the Si alloy-containing negative electrode active material to ensure good balance of higher cycle performance (high 50th-cycle discharge capacity retention) with high initial capacity and high charge/discharge efficiency. The Si alloy-containing negative electrode active material attains more excellent characteristics by controlling not only the content of the high-capacity element Si but also the contents of the first additive element C and the second additive element Al to within the respective preferable ranges (see TABLE 1 and the range encircled by the solid thick line in FIGS. 7 and 8). It is advantageous in that it is possible to attain a high capacity (1113 mAh/g or higher, preferably 1133 mAh/g or higher), a high charge/discharge efficiency (94% or higher) and a higher discharge capacity retention (64% or higher, preferably 74% or higher) at the 50th cycle when the mass % of the high-capacity element Si (value x) is in the more preferable range of $41 \le x \le 71$ (see TABLE 1 and the range encircled by the solid thick line in FIGS. 7 and 8).

The mass % of the high-capacity element Si (value x) in the alloy is especially preferably in the range of $43 \le x \le 61$ in order for the Si alloy-containing negative electrode active material to ensure good balance of particularly high cycle performance (high 50th-cycle discharge capacity retention) with high initial capacity and high charge/discharge efficiency. The Si alloy-containing negative electrode active material attains the most excellent characteristics by controlling not only the content of the high-capacity element Si but also the contents of the first additive element C and the second additive element Al to within the respective preferable ranges (see TABLE 1 and the range encircled by the solid thick line in FIG. 9). It is more advantageous in that it is possible to attain a high capacity (1192 mAh/g or higher), a high charge/discharge efficiency (97% or higher) and a particularly high discharge capacity retention (81% or higher) at the 50th cycle when the mass % of the high-capacity element Si (value x) is in the more preferable range of $43 \le x \le 61$ (see TABLE 1 and the range encircled by the solid thick line in FIG. 9). In contrast to the tertiary alloy $Si_xC_yAl_z$, it is not possible for binary alloys in which either one of the additive elements (C, Al) is not added to Si (i.e. Si—Al alloy where y=0 and Si—C alloy where z=0) to attain a high initial charge/discharge efficiency and high cycle performance. In particular, the Si binary alloy cannot maintain a sufficient initial charge/discharge efficiency and high discharge capacity retention at the 50th cycle. The Si binary alloy is not sufficient in initial charge/discharge efficiency and is low (deteriorates) in cycle performance. By the use of such Si binary alloy in the negative electrode active material, high capacity, high charge/discharge efficiency and high 50th-cycle discharge capacity retention cannot be realized with the best balance in the same manner as mentioned above. In the case of x=100 (pure Si containing no additive elements C and Al), there is a trade-off relationship between capacity and cycle durability. It is thus very difficult for the pure Si to attain high cycle durability while maintaining high capacity. The negative electrode active material solely of high-capacity element Si shows the highest capacity, but the worst and significantly low discharge capacity retention due to remarkable deterioration by expansion/shrinkage of Si during charge/discharge operation. By the use of such pure Si in the negative electrode active material, high capacity, high initial charge/discharge efficiency and higher 50th-cycle discharge capacity retention cannot also be realized with the best balance in the same manner as mentioned above.

Figure 7:
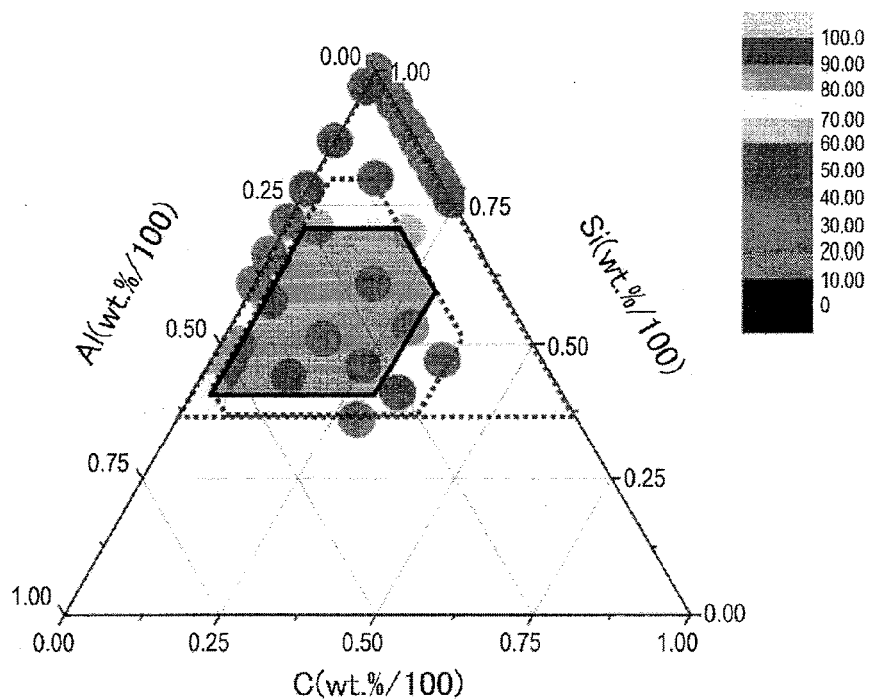
FIG. 7 is a diagram in which the more preferable composition range of the Si—C—Al alloy samples of Example 1, where Si+C+Al (each in units of wt %/100)=1.00; $0.41 \leq Si$ (wt %/100)$\leq 0.71$; $0.03 \leq C$ (wt %/100)$\leq 0.29$; and $0.10 \leq Al$ (wt %/100)$\leq 0.56$, is encircled and color-coded (shaded) on the Si—C—Al ternary alloy composition diagram of FIG. 4.
Figure 8:
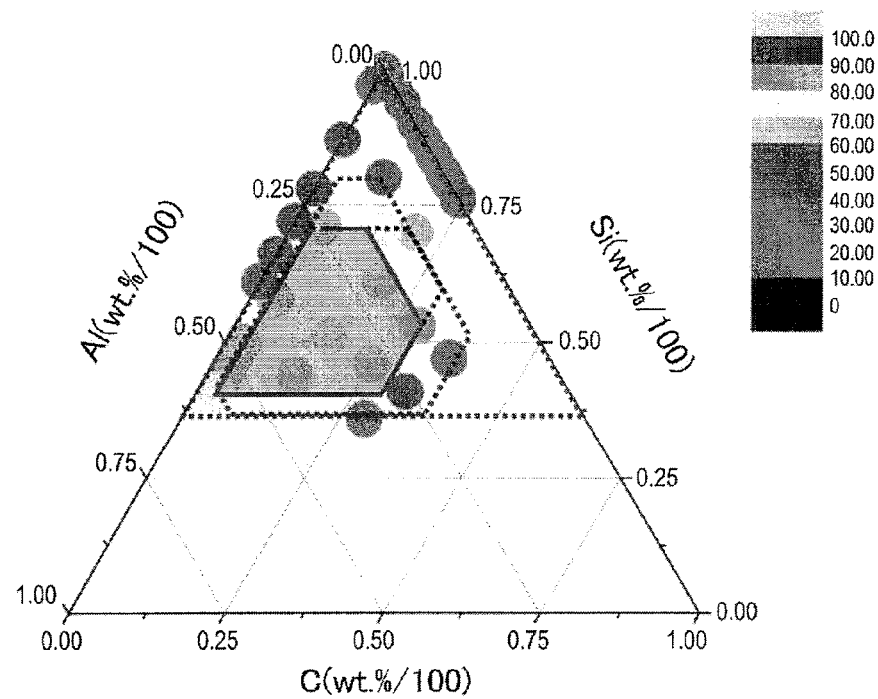
FIG. 8 is a diagram in which the still more preferable composition range of the Si—C—Al alloy samples of Example 1, where Si+C+Al (each in units of wt %/100)=1.00; $0.41 \leq Si$ (wt %/100)$\leq 0.71$; $0.03 \leq C$ (wt %/100)$\leq 0.29$; and $0.15 \leq Al$ (wt %/100)$\leq 0.56$, is encircled and color-coded (shaded) on the Si—C—Al ternary alloy composition diagram of FIG. 4.
Figure 9:
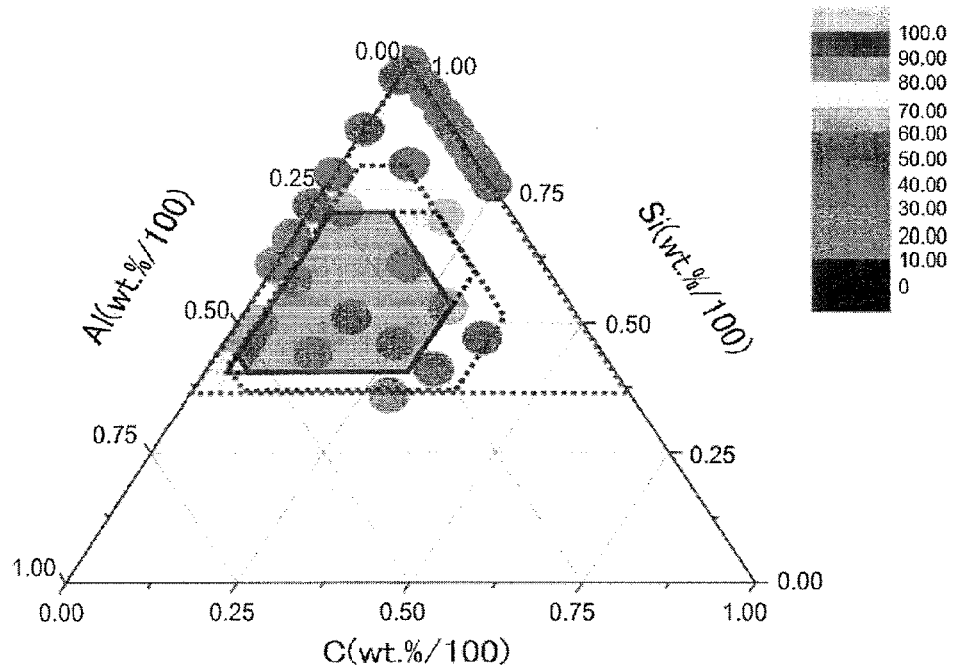
FIG. 9 is a diagram in which the especially preferable composition range of the Si—C—Al alloy samples of Example 1, where Si+C+Al (each in units of wt %/100)=1.00; $0.43 \leq Si$ (wt %/100)$\leq 0.61$; $0.03 \leq C$ (wt %/100)$\leq 0.29$; and $0.20 \leq Al$ (wt %/100)<0.54, is encircled and color-coded (shaded) on the Si—C—Al ternary alloy composition diagram of FIG. 4.

In the case of $x \ge 41$, in particular, $x \ge 43$, the composition ratio (balance) of the high-capacity element Si, which has an initial capacity of 3200 mAh/g, and the first and second additive elements C and Al is in the most preferable, optimum range (range encircled by the solid thick line in FIGS. 7 to 9). This makes it possible for the Si alloy-containing negative electrode active material to attain the most excellent characteristics and stably and safely maintain the sufficiently high level of capacity for vehicle use over a long time. In the case of $x \le 71$, in particular, $x \le 61$, the composition ratio (balance) of the high-capacity element Si, which has an initial capacity of 3200 mAh/g, and the first and second additive elements C and Al is in the most preferable, optimum range (range encircled by the solid thick line in FIGS. 7 to 9). This makes it possible for the Si alloy-containing negative electrode active material to remarkably prevent amorphous-to-crystalline phase transition at the time of alloying of Si with Li and obtain significant improvements in cycle lifetime and charge/discharge efficiency. Thus, the Si alloy-containing negative electrode active material attains a discharge capacity retention of 64% or higher, preferably 74% or higher, more preferably 81% or higher, at the 50th cycle and an initial charge/discharge efficiency of 94% or higher, preferably 97% or higher. It should be however understood that, as long as the above effects of the present embodiment can be effectively exhibited, the negative electrode active material falls within the technical scope (scope of protection) of the present invention even when the value x is out of the above optimum range ($41 \leq x \leq 71$, preferably $43 \leq x \leq 61$).

As mentioned above, it is indicated that cycle performance deterioration occurs due to considerable capacity deterioration only after 5 to 6 cycles in Examples of Patent Document 1. In Examples of Patent Document 1, the discharge capacity retention is reduced to 90% to 95% at the 5th or 6th cycle and will be reduced to about 50% to 0% at 50th cycle. In the present embodiment, by contrast, the mutually complementary combination (only one combination) of the Si element and the first and second additive elements C and Al is selected through a multitude of trials and errors and excessive experiments using enormous combinations of Si and metal and non-metal elements. In this element combination, the content of the high-capacity element Si is controlled to within the above most preferable range. By such element selection and content control, it is advantageously possible for the Si alloy-containing negative electrode active material to attain a high capacity and significantly suppress a deterioration of 50th-cycle discharge capacity retention or initial charge/discharge efficiency. At the time of alloying of Si with Li, the occurrence of a large volume change in the Si alloy-containing negative electrode active material can be limited by preventing amorphous-to-crystalline phase transition under the significant synergistic effect of the optimum range control of the mutually complementary first and second additive elements C and Al. Thus, the Si alloy-containing negative electrode active material improves in electrode cycle durability while securing high capacity and high charge/discharge efficiency.

(3) Mass % of C in Alloy

The value y of the composition formula: $Si_xC_yAl_z$, that is, the mass % of C is in the range of $0<y<64$, preferably $3 \leq y \leq 37$, more preferably $3 \leq y \leq 29$. When the mass % of the first additive element C (value y) is in the range of $0<y<64$, the amorphous-to-crystalline phase transition of the high-capacity Si material can be effectively prevented by the function of C (by the synergistic function of C and Al). This leads to the significant improvement effects on the cycle lifetime (cycle durability) such that the Si alloy-containing negative electrode active material attains a high discharge capacity retention (64% or higher, preferably 74% or higher, preferably 81% or higher) at the 50th cycle (see FIGS. 7 to 9). This also leads to the significant effects on the initial charge/discharge efficiency (94% or higher, preferably 97% or higher) (see TABLE 1). As the numerical content value (value x) of the high-capacity element Si can be maintained at a certain level or more ($36 \leq x \leq 100$), the Si alloy-containing negative electrode active material attains a significantly high capacity that can hardly be attained by conventional carbon-based negative electrode active material. Further, the Si alloy-containing negative electrode active material attains a higher capacity (initial capacity of 1113 mAh/g or higher, preferably 1133 mAh/g or higher, more preferably 1192 mAh/g or higher) than that of conventional Sn-alloy negative electrode active material (see TABLE 1 and FIGS. 5 to 8).

The mass % of the first additive element C (value y) in the alloy is preferably in the range of $3 \leq y \leq 37$ in order for the Si alloy-containing negative electrode active material to ensure good balance of high cycle performance (high 50th-cycle discharge capacity retention) with high initial capacity and high charge/discharge efficiency. As the first additive element C has the function of preventing amorphous-to-crystalline phase transition at the time of alloying of Si with Li for improvement in cycle lifetime, the Si alloy-containing negative electrode active material attains excellent characteristics by controlling the content of such a first additive element C to within the preferable range (see TABLE 1 and the range encircled by the solid thick line in FIG. 6). It is advantageously possible to obtain improvement in cycle lifetime by effectively preventing amorphous-to-crystalline phase transition at the time of alloying when the mass % of the first additive element C (value y) is in the preferable range of $3 \leq y \leq 37$. This composition range (inside the hexagon encircled by the solid thick line in FIG. 6, carbon content: $3 \leq y \leq 37$) corresponds to the range where high capacity (1113 mAh/g or higher) and high initial charge/discharge efficiency (94% or higher) were actually realized in samples 1 to 18 of Example 1 as will be explained later. The selection of such a composition range, in particular, C content of $3 \leq x \leq 37$ makes it possible for the Si alloy-containing negative electrode active material to attain high initial charge/discharge efficiency and cycle durability as compared to conventional Sn-based negative electrode active material and multi metal alloy negative electrode active material of Patent Document 1.

The mass % of the first additive element C (value y) in the alloy is especially preferably in the range of $3 \leq y \leq 29$ in order for the Si alloy-containing negative electrode active material to ensure the best balance of higher cycle performance (high 50th-cycle discharge capacity retention) with high initial capacity and high charge/discharge efficiency. As the first additive element C has the function of preventing amorphous-to-crystalline phase transition at the time of alloying with Li for improvement in cycle lifetime, the Si alloy-containing negative electrode active material attains the most excellent characteristics by controlling the content of such a first additive element C to within the most preferable, optimum range (see TABLE 1 and FIGS. 7 to 9). It is advantageously possible to obtain further improvement in cycle lifetime by more effectively preventing amorphous-to-crystalline phase transition at the time of alloying when the mass % of the first additive element C (value y) is in the most preferable range of $3 \leq y \leq 29$. Thus, the Si alloy-containing negative electrode active material attains a high initial capacity of 1133 mAh/g or higher, preferably 1192 mAh/g or higher, a high initial charge/discharge efficiency of 94% or higher, preferably 97% or higher, and a high discharge capacity retention of 64% or higher, preferably 74% or higher, more preferably 81% or higher at the 50th cycle (see TABLE 1 and FIGS. 7 to 9). This composition range corresponds to the range (inside the hexagon encircled by the solid thick line in FIGS. 7 to 9, C content: $3 \leq y \leq 29$) where higher capacity, high charge/discharge efficiency and high 50th-cycle discharge capacity retention were actually realized among samples 1 to 18. The selection of such a composition range, in particular, C content of $3 \leq x \leq 29$ makes it possible for the Si alloy-containing negative electrode active material to attain the best balance of high initial capacity, high charge/discharge efficiency and high cycle durability as compared to conventional Sn-based negative electrode active material and multi metal alloy negative electrode active material of Patent Document 1. In contrast to the tertiary alloy $Si_xC_yAl_z$, it is not possible for binary alloys in which either one of the additive elements (C, Al) is not added to Si (notably, Si—Al alloy where y=0) to attain a high charge/discharge efficiency and high cycle performance. In particular, the Si binary alloy cannot maintain a sufficient initial charge/discharge efficiency and high discharge capacity retention at the 50th cycle. The Si binary alloy is low (deteriorates) in initial charge/discharge efficiency and in cycle performance. By the use of such Si binary alloy in the negative electrode active material, high capacity, high charge/discharge efficiency and higher cycle durability cannot be realized with the best balance in the same manner as mentioned above.

In the case of y≥3 (C content: 3 mass % or more), the composition ratio (balance) of the high-capacity element Si, which has an initial capacity of 3200 mAh/g, and the first additive element C is in the most preferable, optimum range (range encircled by the solid thick line in FIGS. 7 to 9). At the time of alloying of Si with Li, the amorphous-to-crystalline phase transition of the high-capacity Si material can be effectively prevented by the function of C (by the synergistic function of C and Al) such that the Si alloy-containing negative electrode active material attains a high capacity and significantly improves in cycle lifetime (discharge capacity retention) and charge/discharge efficiency. This makes it possible for the Si alloy-containing negative electrode active material to attain the more excellent characteristics and stably and safely maintain the high level of capacity for vehicle use over a long time. In the case of y≤29 (C content: 29 mass % or less), the composition ratio (balance) of the high-capacity element Si, which has an initial capacity of 3200 mAh/g, and the first additive element C is in the most preferable, optimum range (range encircled by the solid thick line in FIGS. 7 to 9). The amorphous-to-crystalline phase transition of the high-capacity Si material can be effectively prevented at the time of alloying of Si with Al, so as to obtain significant improvement in cycle lifetime. Thus, the Si alloy-containing negative electrode active material attains a high initial capacity of 1133 mAh/g or higher, preferably 1192 mAh/g or higher, a high initial charge/discharge efficiency of 94% or higher, preferably 97% or higher and a high discharge capacity retention of 64% or higher, preferably 74% or higher, more preferably 81% or higher, at the 50th cycle. It should be however understood that, as long as the above effects of the present embodiment can be effectively exhibited, the negative electrode active material falls within the technical scope (scope of protection) of the present invention even when the value y is out of the above optimum range (3≤y≤29).

As mentioned above, it is indicated that cycle performance deterioration occurs due to considerable capacity deterioration only after 5 to 6 cycles in Examples of Patent Document 1. In Examples of Patent Document 1, the discharge capacity retention is reduced to 90% to 95% at the 5th or 6th cycle and will be reduced to about 50% to 0% at 50th cycle. In the present embodiment, by contrast, the mutually complementary combination (only one combination) of the high-capacity Si element and the first additive element C (and the second additive element Al) is selected through a multitude of trials and errors and excessive experiments using enormous combinations of Si and metal and non-metal elements. In this element combination, the content of the additive element C is controlled to within the above most preferable range. By such element selection and content control, it is advantageously possible for the Si alloy-containing negative electrode active material to attain a high capacity and significantly suppress a deterioration of 50th-cycle discharge capacity retention or initial charge/discharge efficiency. At the time of alloying of Si with Li, the occurrence of a large volume change in the Si alloy-containing negative electrode active material can be limited by preventing amorphous-to-crystalline phase transition under the significant synergistic effect of the optimum range control of the first additive element C (and the second additive element Al mutually complementary to C). The Si alloy-containing negative electrode active material thus improves in electrode cycle durability and initial charge/discharge efficiency while securing high capacity (see TABLE 1 and FIGS. 7 to 9).

(4) Mass % of Al in Alloy

The value z of the composition formula: $Si_xC_yAl_z$, that is, the mass % of Al is in the range of 0<z<64, preferably 10≤z≤56, more preferably 15≤z≤56, still more preferably 20≤z≤54. The second additive element Al has the function of not causing a decrease of electrode capacity with increase in the concentration of the first additive element in the alloy. When the mass % of such a second additive element Al (value z) is in the range of 0<z<64, the amorphous-to-crystalline phase transition of the high-capacity Si material can be effectively prevented by the function of C (by the synergistic function of C and Al). This leads to the significant effects such that the Si alloy-containing negative electrode active material attains a high capacity e.g. high initial capacity, a high initial charge/discharge efficiency and a good cycle lifetime (high cycle durability). In particular, the Si alloy-attains negative electrode active material attains a high initial capacity of 1113 mAh/g or higher, preferably 1133 mAh/g or higher, more preferably 1192 mAh/g or higher, a high initial charge/discharge efficiency of 94% or higher, preferably 97% or higher and a high discharge capacity retention of 64% or higher, preferably 74% or higher, more preferably 81% or higher, at the 50th cycle (see TABLE 1 and FIGS. 7 to 9). As the numerical content value (value x) of the high-capacity element Si can be maintained at a certain level or more (36≤x≤100), the Si alloy-containing negative electrode active material attains a significantly high capacity that can hardly be attained by conventional carbon-based negative electrode active material. Further, the Si alloy-containing negative electrode active material attains a higher capacity than that of conventional Sn-based alloy negative electrode active material.

The mass % of the second additive element Al (value z) in the alloy is preferably in the range of 10≤z≤56 in order for the Si alloy-containing negative electrode active material to ensure good balance of high cycle performance with high initial capacity and high initial charge/discharge efficiency. As mentioned above, the first additive element C has the function of preventing amorphous-to-crystalline phase transition at the time of alloying of Si with Li for improvement in cycle lifetime; and the second additive element Al has the function of preventing the capacity of the negative electrode active material (negative electrode) from decreasing with increase in the concentration of the first additive element. The selection of the first and second additive elements C and Al is very important and effective in the present embodiment. There has been found a remarkable difference in function and effects between the Si alloy with these first and second additive elements and the conventional alloy such as tertiary or quaternary alloy of Patent Document 1 etc. or binary alloy such as Si—C alloy or Si—Al alloy. The Si alloy-containing negative electrode active material attains excellent characteristics by controlling the content of such a second additive element Al (and the content of the first additive element C mutually complementary to Al) to within the preferable range (see TABLE 1 and the range encircled by the solid thick line in FIG. 7). It is possible to effectively prevent amorphous-tocrystalline phase transition at the time of alloying by the synergistic function (mutually complementary function) of the first and second additive elements C and Al when the mass % of the second additive element Al (value z) is in the preferable range of 10≤z≤56. This leads to the significant effects such that the Si alloy-containing negative electrode active material attains a high capacity e.g. high initial capacity, a high initial charge/discharge efficiency and a good cycle lifetime (high cycle durability). In particular, the Si alloy-containing negative electrode active material attains a high initial capacity of 1113 mAh/g or higher, preferably 1133 mAh/g or higher, more preferably 1192 mAh/g or higher, a high initial charge/discharge efficiency of 94% or higher and a high discharge capacity retention of 64% or higher at the 50th cycle (see TABLE 1 and FIG. 7). This composition range (inside the hexagon encircled by the solid thick line in FIG. 7, aluminum content: 10≤z≤56) corresponds to the range where high capacity, high initial charge/discharge efficiency and good cycle lifetime (high cycle durability) were actually realized among samples 1 to 18 of Example 1. The selection of such a composition range, in particular, Al content of 10≤z≤56 makes it possible for the Si alloy-containing negative electrode active material to attain high cycle durability by the synergistic function of the first and second additive elements C and Al as compared to conventional Sn-based negative electrode active material and multi metal alloy negative electrode active material of Patent Document 1. The Si alloy-containing negative electrode active material attains a discharge capacity retention of 64% or higher at the 50th cycle (see TABLE 1 and the range encircled by the solid thick line in FIG. 9).

The mass % of the second additive element Al (value z) in the alloy is more preferably in the range of 15≤z≤56 in order for the Si alloy-containing negative electrode active material to ensure good balance of higher cycle performance with high initial capacity and high charge/discharge efficiency. As the amorphous-to-crystalline phase transition of the high-capacity Si material can be prevented by the synergistic function (mutually complementary function) of Al and C at the time of alloying of Si with Li so as to obtain improvement in cycle lifetime, the Si alloy-containing negative electrode active material attains excellent characteristics by controlling the content of the second additive element Al to within the more preferable range. It is possible to effectively prevent amorphous-to-crystalline phase transition by the synergistic function (mutually complementary function) of Al and C at the time of alloying when the mass % of the second additive element Al (value z) is in the more preferable range of 15≤z≤56, This leads to the significant effects such that the Si alloy-containing negative electrode active material attains a high capacity e.g. high initial capacity, a high initial charge/discharge efficiency and a good cycle lifetime (high cycle durability). In particular, the Si alloy-containing negative electrode active material attains a high initial capacity of 1133 mAh/g or higher, a high initial charge/discharge efficiency of 94% or higher and a high discharge capacity retention of 74% or higher at the 50th cycle (see TABLE 1 and FIG. 8). This composition range (aluminum content: 15≤z≤56) corresponds to the range inside the hexagon encircled by the solid thick line in FIG. 8 where higher capacity, high initial charge/discharge efficiency and better cycle lifetime (higher cycle durability) were actually realized among samples 1 to 18 of Example 1. The selection of such a composition range, in particular, Al content of 15≤z≤56 makes it possible for the Si alloy-containing negative electrode active material to attain well-balanced characteristics such as not only high capacity but also high cycle durability and initial charge/discharge efficiency by the synergistic function of the first and second additive elements C and Al as compared to conventional Sn-based negative electrode active material and multi metal alloy negative electrode active material of Patent Document 1.

The mass % of the second additive element Al (value z) in the alloy is especially preferably in the range of 20≤z≤54 in order for the Si alloy-containing negative electrode active material to ensure the best balance of higher cycle performance with high initial capacity and high charge/discharge efficiency. As the amorphous-to-crystalline phase transition of the high-capacity Si material can be prevented by the synergistic function (mutually complementary function) of Al and C at the time of alloying of Si with Li so as to obtain improvement in cycle lifetime, the Si alloy-containing negative electrode active material attains excellent characteristics by controlling the content of the second additive element Al to within the most preferable range. It is possible to effectively prevent amorphous-to-crystalline phase transition by the synergistic function (mutually complementary function) of Al and C at the time of alloying when the mass % of the second additive element Al (value z) is in the most preferable range of 20≤z≤54. This leads to the significant effects such that the Si alloy-containing negative electrode active material attains a high capacity e.g. high initial capacity, a high initial charge/discharge efficiency and a good cycle lifetime (high cycle durability). In particular, the Si alloy-containing negative electrode active material attains a high initial capacity of 1192 mAh/g or higher, a high initial charge/discharge efficiency of 97% or higher and a high discharge capacity retention of 81% or higher at the 50th cycle (see TABLE 1 and FIG. 9). This composition range (aluminum content: 15≤z≤56) corresponds to the range inside the hexagon encircled by the solid thick line in FIG. 9 where higher capacity, high initial charge/discharge efficiency and better cycle lifetime (higher cycle durability) were actually realized among samples 1 to 18 of Example 1. The selection of such a composition range, in particular, Al content of 20≤z≤54 makes it possible for the Si alloy-containing negative electrode active material to attain well-balanced characteristics such as not only high capacity but also particularly high cycle durability and initial charge/discharge efficiency by the synergistic function of the first and second additive elements C and Al as compared to conventional Sn-based negative electrode active material and multi metal alloy negative electrode active material of Patent Document 1. In contrast to the tertiary alloy $Si_xC_yAl_z$, it is not possible for binary alloys in which either one of the additive elements (C, Al) is not added to Si (notably, Si—C alloy where z=0) to attain a high charge/discharge efficiency and high cycle performance. In particular, the Si binary alloy cannot maintain a sufficient initial charge/discharge efficiency and high discharge capacity retention at the 50th cycle. The Si binary alloy is low (deteriorates) in initial charge/discharge efficiency and in cycle performance. By the use of such Si binary alloy in the negative electrode active material, high capacity, high charge/discharge efficiency and higher cycle durability cannot be realized with the best balance in the same manner as mentioned above.

In the case of z≥10, particularly z≥15, more particularly z≥20, the composition ratio (balance) of the high-capacity element Si, which has an initial capacity of 3200 mAh/g, the first additive element C and the second additive element Al is in the most preferable, optimum range (range encircled by the solid thick line in FIGS. 7 to 9). The amorphous-to-crystalline phase transition of the high-capacity Si material can be effectively prevented by the function of C (by the synergistic function of C and Al). By the function of Al, the capacity of the negative electrode active material (negative electrode) can be effectively prevented from decreasing even if the concentration of C increases to prevent amorphous-to-crystalline phase transition. The Si alloy-containing negative electrode active material thus attains a high capacity and significantly improves in cycle lifetime (discharge capacity retention) and charge/discharge efficiency. This makes it possible for the Si alloy-containing negative electrode active material to attain the most excellent characteristics and stably and safely maintain the sufficiently high level capacity for vehicle use over a long time. In the case of z≤56, particularly z≤54, the composition ratio (balance) of the high-capacity element Si, which has an initial capacity of 3200 mAh/g, the first additive element C and the second additive element Al is in the most preferable, optimum range (range encircled by the solid thick line in FIGS. 7 to 9). The amorphous-to-crystalline phase transition of the high-capacity Si material can be effectively prevented at the time of alloying of Si with Li. The Si alloy-containing negative electrode active material thus significantly improves in cycle lifetime (discharge capacity retention) and charge/discharge efficiency while securing high capacity. In particular, the Si alloy-containing negative electrode active material attains a high initial capacity of 1133 mAh/g or higher, preferably 1192 mAh/g or higher, a high initial charge/discharge efficiency of 94% or higher, preferably 97% or higher and a high discharge capacity retention of 64% or higher, preferably 74% or higher, more preferably 81% or higher, at the 50th cycle. It should be however understood that, as long as the above effects of the present embodiment can be effectively exhibited, the negative electrode active material falls within the technical scope (scope of protection) of the present invention even when the value z is out of the above optimum range (10≤z≤56, preferably 15≤z≤56, more preferably 20≤z≤54).

As mentioned above, it is indicated that cycle performance deterioration occurs due to considerable capacity deterioration only after 5 to 6 cycles in Examples of Patent Document 1. In Examples of Patent Document 1, the discharge capacity retention is reduced to 90% to 95% at the 5th or 6th cycle and will be reduced to about 50% to 0% at 50th cycle. In the present embodiment, by contrast, the mutually complementary combination (only one combination) of the high-capacity Si element, the first additive element C and the second additive element Al is selected through a multitude of trials and errors and excessive experiments using enormous combinations of Si and metal and non-metal elements. In this element combination, the content of the additive element Al is controlled to within the above most preferable range. By such element selection and content control, it is advantageously possible for the Si alloy-containing negative electrode active material to attain a high capacity and significantly suppress a deterioration of 50th-cycle discharge capacity retention or initial charge/discharge efficiency. At the time of alloying of Si with Li, the occurrence of a large volume change in the Si alloy-containing negative electrode active material can be limited by preventing amorphous-to-crystalline phase transition under the significant synergistic effect of the optimum range control of the second additive element Al (and the first additive element C mutually complementary to Al). Thus, the Si alloy-containing negative electrode active material obtains improvement in electrode cycle durability while securing high capacity and charge/discharge efficiency.

(5) Production Method of Alloy $Si_xC_yAl_z$

There is no particular limitation on the production method of the alloy represented by the composition formula: $Si_xC_y$-$Al_z$. The alloy can be produced by various known methods. As there occurs almost no difference in the state and properties of the alloy depending on the production method, it is feasible to adopt every conceivable method for production of the alloy.

As a method (i) for producing the alloy represented by the composition formula: $Si_xC_yAl_z$ in thin film form, there can be adopted multi-element PVD method (such as sputtering (method used in the Examples), resistance heating and laser ablation), multi-element CVD (chemical vapor phase deposition) or the like.

There can be adopted mechanical alloying, arc plasma melting or the like as a method (ii) for producing the alloy represented by the composition formula: $Si_xC_yAl_z$ in particle form.

As to the above alloy thin film production method (i), the negative electrode (electrode) is obtained by forming (film formation) the alloy thin film directly on the collector. This method is thus advantageous in process simplification. Further, there is no need to use any components other than the alloy (negative electrode active material), such as a binder and a conductive agent, for the formation of the negative electrode active material layer (negative electrode). The thin film electrode can be formed solely from the alloy (negative electrode active material). This method is thus also advantageous in that the thus-formed electrode attains a sufficiently high level of capacity and high energy density for practical use in vehicles. This method is also suitable for investigating the electrochemical characteristics of the active material.

In the alloy thin film production method (i), the $Si_xC_yAl_z$ alloy thin films of varying alloy composition and thickness can be arbitrarily formed on substrate (current collector) surface by using an independently controlled ternary DC magnetron sputtering apparatus as a multi-element DC magnetron sputtering apparatus. More specifically, it is feasible to obtain various alloy samples by setting the target 1 to Si, the target 2 to C and the target 3 to Al, fixing a sputtering time and changing a power level of a DC power source (see Samples 1 to 33 of Example 1 for detail). For example, the power level of the DC power source can be set to 185 W for Si, 50 W for C and 50 W for Al for the formation of various tertiary alloy composition samples. The sputtering conditions are however varied depending on the sputtering apparatus. It is thus desirable to figure out, for each sputtering apparatus, the preferred range of the sputtering conditions through an appropriate preliminary experiment or the like. See e.g. the sputtering conditions, target specs, electrode sample specs for the sputtering apparatus in the after-mentioned Example. For example, the power level of the DC power source is preferably in the range of Si: 185 W, C: 50 to 200 W, and Al: 30 to 90 W in the case where the sputtering time is fixed under the sputtering conditions, target specs, electrode sample specs of the sputtering apparatus in Example. Within such range, the $Si_xC_yAl_z$ alloy thin films can be formed in amorphous form. However, the above power levels are merely the preferred range (reference value) under the sputtering conditions, the target specs, and the electrode sample specs of the sputtering apparatus in Example 1 and are varied depending on the sputtering apparatus as described above. It is thus desirable to figure out, for the respective sputtering apparatuses, the preferred ranges of the sputtering conditions, the target specs, the electrode sample specs, and the like through appropriate preliminary experiments or the like as mentioned above.

As to the above alloy particle production method (ii), on the other hand, the slurry electrode is obtained by adding a binder, a conductive agent, a viscosity adjusting solvent etc. to the alloy particles and applying the resulting slurry. This method is advantageous in that the electrode is easy to put into practical use as actual battery electrode due to ease of mass production as compared to the above method (i). It is however considered that the above method (i) is more suitable for investigating the electrochemical characteristics of the active material because the binder and the conductive agent etc. have a large influence on the electrochemical characteristics of the active material.

(6) Average Particle Size of Alloy in Particle Form

In the case of using the alloy in particle form as in the above explanation (5) (ii), there is no particular limitation on the average particle size of the alloy. The average particle size of the alloy can be set substantially equal to that of conventional negative electrode active material in negative electrode active material layer 15. In terms of high output, the average particle size of the alloy is preferably 1 to 20 µm. However, the average particle size of the alloy is not limited to the above specific range and may be out of the above specific range as long as the effects of the present embodiment are effectively exhibited.

(Requirements Common to Positive and Negative Electrode Active Material Layers 13 and 15)

The requirements common to positive and negative electrode active material layers 13 and 15 will be explained below.

A binder is contained in positive electrode active material layer 13 and in negative electrode active material layer 15 in the case of using the alloy in particle form as in the above explanation (5), (ii).

There is no particular limitation on the binder used in the active material layers. Examples of the binder usable in the active material layer includes, but are not particularly limited to, the following materials: thermoplastic polymers such as polyethylene, polypropylene, polyethylene terephthalate (PET), polyethernitrile (PEN), polyacrylonitrile, polyimide, polyamide, cellulose, carboxymethylcellulose (CMC), ethylene-vinyl acetate copolymer, polyvinyl chloride, styrene-butadiene rubber (SBR), isoprene rubber, butadiene rubber, ethylene-propylene rubber, ethylene-propylene-diene copolymer, styrene-butadiene-styrene block copolymer and hydrogenated products thereof, and styrene-isoprene-styrene block copolymer and hydrogenated products thereof; fluorine resins such as polyvinylidene fluoride (PVdF), polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoroethylene copolymer (ETFE), polychlorotrifluoroethylene (PCTFE), ethylene-chlorotrifluoroethylene copolymer (ECTFE) and polyvinyl fluoride (PVF); vinylidene fluoride-based fluorine rubbers such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber) and vinylidene fluoride-chlorotrifluoroethylene-based fluorine rubber (VDF-CTFE-based fluorine rubber); and epoxy resins. Among others, polyvinylidene fluoride, polyimide, styrene-butadiene rubber, carboxymethylcellulose, polypropylene, polytetrafluoroethylene, polyacrylonitrile and polyamide are preferred. These preferred binders are suitable for use in the active material layers in terms of high heat resistance, remarkably wide potential window and stability against both of positive and negative electrode potentials. The binders may be used alone or in combination of two or more thereof.

There is no particular limitation on the amount of the binder in the active material layer as long as the binder is contained in a sufficient amount to bind the active material. The amount of the binder in the active material layer is preferably 0.5 to 15 mass %, more preferably 1 to 10 mass %, based on the total mass of the active material layer.

There can be contained other additives such as a conductive agent, an electrolyte salt (lithium salt) and an ion-conducting polymer in the active material layers.

The conductive agent refers to an additive for improvement in the electrical conductivity of the positive or negative electrode active material layer. Examples of the conductive agent include carbon materials such as carbon black e.g. Acetylene Black, graphite and vapor-grown carbon fiber. When the conductive material is contained in the active material layer, it is possible to form an electron network effectively inside the active material layer and to contribute to improvement in battery output performance.

A conductive binder, which has the functions of the conductive agent and the binder, may be used in place of the conductive agent and the binder or in combination with one or both of the conductive agent and the binder. Examples of the conductive binder include those commercially available under the product name of TAB-2 (manufactured by Hohsen Corporation) etc.

Examples of the electrolyte salt (lithium salt) include $Li(C_2F_5SO_2)_2N$, $LiPF_6$, $LiBF_4$, $LiClO_4$, $LiAsF_6$ and $LiCF_3SO_3$.

Examples of the ion-conducting polymer include polyethylene oxide (PEO)-based polymers and polypropylene oxide (PPO)-based polymers.

There is no particular limitation on the component ratio of the positive electrode active material layer and the component ratio of the negative electrode active material layer in the case of using the alloy in particle form as in the above explanation (5), (ii). The component ratio of the active material layer can be adjusted as appropriate in the light of any knowledge about non-aqueous solvent secondary batteries.

There is no particular limitation on the thickness of each active material layer (active material layer on one side of the collector). The thickness of the active material layer can be adjusted as appropriate in the light of any knowledge about batteries. For example, the thickness of the active material layer is generally of the order of 1 to 500 µm, preferably 2 to 100 µm, in view of battery usage (output-oriented use energy-oriented use etc.) and ion conductivity.

(Collector)

Collectors 11 and 12 are each formed of a conductive material. The size of the collector is determined depending on the purpose of use of the battery. For example, the collector is made large in area for use in large-size batteries where high energy density is required. There is no particular limitation on the thickness of the collector. The thickness of the collector is generally of the order of 1 to 100 µm. There is also no particular limitation on the form of the collector. In stacked battery 10 shown in FIG. 1, the collector may be in the form of a current collecting foil, a lattice (e.g. expanded grid) or the like. In the case of applying the thin film alloy of the negative electrode active material directly to negative electrode collector 12 by sputtering etc., the current collecting coil is preferably used as the collector.

There is no particular limitation on the material of the collector. As the material of the collector, there can be used a metal material, a conductive polymer material or a resin in which a conductive filler is added to a nonconductive polymer material. Examples of the metal material include aluminum, nickel, iron, stainless steel, titanium and copper. A clad material of nickel and aluminum, a clad material of copper and aluminum and a plating material of combination of these metals are also suitably usable as the metal material. It is alternatively feasible to use a foil material having a metal surface coated with aluminum. Among others, aluminum, stainless steel and copper are preferred in terms of electron conductivity and battery operation potential.

Examples of the conductive polymer material include polyaniline, polypyrrole, polythiophene, polyacetylene, polyparaphenylene, polyphenylene vinylene, polyacrylonitrile and polyoxadiazole. These conductive polymer materials are advantageous in terms of case of production and reduction of collector weight because each of these conductive polymer materials shows sufficient electrical conductivity even without the addition of a conductive filler.

Examples of the nonconductive polymer material includes polyethylene (PE: high-density polyethylene (HDPE), low-density polyethylene (LDPE)), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethylacrylate (PMA), polymethylmethacrylate (PMMA), polyvinyl chloride (PVC), polyvinylidene fluoride (PVdF) and polystyrene (PS). These nonconductive polymer materials have good potential resistance and solvent resistance.

The conductive filler is added to the conductive polymer material or the nonconductive polymer material as needed. In the case where the nonconductive polymer material is used alone as the base resin of the collector, the conductive filler is essential in order to impart electrical conductivity to the resin. There is no particular limitation on the conductive filler as long as the conductive filler is a material having electrical conductivity. A metal material or a conductive carbon material can be used as the filler having good electrical conductivity, potential resistance and lithium-ion shielding property. There is no particular limitation on the metal material. The metal material preferably includes at least one kind of metal selected from the group consisting of Ni, Ti, Al, Cu, Pt, Fe, Cr, Sn, Zn, In, Sb and K or an alloy or metal oxide containing any of these metals. There is no particular limitation on the conductive carbon material. The conductive carbon material preferably includes at least one kind selected from the group consisting of Acetylene Black, Vulcan, Black Pearl, carbon nanofibers, Ketjen Black, carbon nanotubes, carbon nanohorns, carbon nanoballons and fullerene. There is no particular limitation on the amount of the conductive filler as long as the conductive filler is added in such an amount as to impart sufficient electrical conductivity to the collector. In general, the amount of the conductive tiller in the polymer material is 5 to 35 mass %.

(Electrolyte Layer)

As the electrolyte of electrolyte layer 17, there can be used a liquid electrolyte or a polymer electrolyte.

The liquid electrolyte is in the form where a support salt i.e. lithium salt is dissolved in an organic solvent as a plasticizer. Examples of the organic solvent usable as the plasticizer includes carbonates such as ethylene carbonate (EC), propylene carbonate (PC), diethyl carbonate (DEC) and dimethyl carbonate (DMC). Examples of the support salt (lithium salt) are the same as those usable in the electrode active material layer, such as LiBETI.

The polymer electrolyte is classified into a gel electrolyte in which an electrolytic solution is contained and an intrinsic polymer electrolyte in which an electrolytic solution is not contained.

The gel electrolyte is in the form where the above liquid electrolyte (electrolytic solution) is impregnated into a lithium-ion-conductive matrix polymer. Examples of the matrix polymer are polyethylene oxide (PEO), polypropylene oxide (PPO) and copolymers thereof. In these matrix polymers, the electrolytic salt such as lithium salt can be dissolved well.

There is no particular limitation on the amount of the liquid electrolyte (electrolytic solution) in the gel electrolyte. In terms of ion conductivity, the amount of the electrolytic solution is preferably several mass % to about 98 mass %. In the present embodiment, it is particularly effective to use the gel electrolyte in which the electrolytic solution is contained in a large amount of 70 mass % or more.

In the case of forming the electrolyte layer using the liquid electrolyte, gel electrolyte or intrinsic polymer electrolyte, a separator may be provided in the electrolyte layer. Specific examples of the separator include a microporous film or porous flat plate of polyolefin such as polyethylene, polypropylene or the like, a porous plate and a non-woven cloth.

The intrinsic polymer electrolyte is in the form where a support salt (lithium salt) is dissolved in the above matrix polymer and does not contain an organic solvent as a plasticizer. In the case of forming the electrolyte layer using the intrinsic polymer electrolyte, there is no fear of liquid leakage from the battery so that the battery improves in reliability.

The matrix polymer of the gel electrolyte or intrinsic polymer electrolyte can provide good mechanical strength by formation of a cross-linking structure. It is feasible to form the cross-linking structure by subjecting a polymerizable material (such as PEO or PPO) for formation of the polymer electrolyte to any polymerization reaction such as thermal polymerization, ultraviolet polymerization, radiation induced polymerization or electron-beam induced polymerization with the use of any appropriate polymerization initiator.

(Collector Plates and Leads)

Collector plates may be used in order to take electric current out of the battery. The collector plates are electrically connected to the collectors and leads and led out from the battery package of laminate film.

There is no particular limitation on the material of the collector plates. There can be used any commonly known high conductive materials for collectors of lithium-ion secondary batteries. Preferred examples of the collector plate material include metal materials such as aluminum, copper, titanium, nickel, stainless steel (SUS) and alloys thereof. Among others, aluminum and copper are more preferred in terms of light weight, corrosion resistance and high electrical conductivity. The positive and negative electrode collector plates can be of the same material or of different materials.

Positive and negative electrode terminal leads may also be used as needed. As the material of the positive and negative electrode terminal leads, there can be used any commonly known terminal lead materials for lithium-ion secondary batteries. It is desirable to cover any parts of the leads led out of battery package 19 with heat-resistant, heat-shrinkable insulating tubes etc. so as not to cause ground fault upon contact with peripheral equipment or wiring and thereby not to affect the performance of the product (automotive part, notably electronic equipment).

(Battery Package)

As battery package 29, there can be used a known metal can casing or a bag-shaped casing of aluminum-containing laminate film capable to cover therewith the power generation element. Examples of the laminate film include, but are not limited to, a three-layer composite laminate film in which a polypropylene layer, an aluminum layer and a nylon layer are laminated in this order. Among others, laminate film is preferred in terms of high output and cooling performance and battery usage in large appliances such as EV and HEV.

The above-structured lithium-ion secondary battery can be produced by any known production method.

<Appearance of Lithium-Ion Secondary Battery>

FIG. 2 is a perspective view showing the appearance of the stacked flat lithium-ion secondary battery.

As shown in FIG. 2, stacked flat lithium-ion secondary battery 50 has a rectangular flat shape. Positive and negative electrode collector plates 58 and 59 are let out from opposite sides of lithium-ion secondary battery 50. In lithium-ion secondary battery 50, power generating element 57 is sealed in battery package 52 by fusing an outer periphery of battery package 52 with positive and negative electrode collector plates 58 and 59 let out from battery package 52. Herein, power generating element 57 correspond to power generating element 21 of lithium-ion secondary battery (stacked battery) 10 of FIG. 1 and has a structure in which a plurality of cells (unit cells) 19 each having positive electrode (positive electrode active material layer) 13, electrolyte layer 17 and negative electrode (negative electrode active material layer) 15 are stacked together.

The lithium-ion secondary battery is not limited to the stacked flat type (stacked cell type). There is no particular limitation on the form of the lithium-ion battery. The lithium-ion battery can be of the winding type. In this case, the winding-type lithium-ion battery may be formed into a cylindrical shape (coin cell) or a prism shape (prismatic cell). It is feasible deform such a cylindrical winding-type lithium-ion secondary battery into a rectangular flat shape. In the case of the cylindrical-shaped or prism-shaped battery, there is no particular limitation on the battery package. There can be used a battery package of laminate film or a conventional cylindrical can (metal can). In terms of light weight, it is preferable to accommodate the power generating element in the battery package of aluminum laminate film.

There is also no particular limitation on the lead-out form of collector plates 58 and 59. The lead-out form of collector plates 58 and 59 is not limited to that of FIG. 2. Alternatively, positive and negative electrode collector plates 58 and 59 may be led out from the same side or may be divided into plural parts and then led out from the respective sides. In the case of the winding-type lithium-ion battery, terminals may be formed using the cylindrical can (metal can) in place of using the collector plates.

As described above, the negative electrode using the negative electrode active material according to the present embodiment and the lithium ion secondary battery using the same can suitably be used for large capacity power sources in electric vehicles, hybrid electric vehicles, fuel cell vehicles, hybrid fuel cell vehicles and the like. Namely, the negative electrode using the negative electrode active material according to the present embodiment and the lithium ion secondary battery using the same are suitable for use in vehicle driving power sources and auxiliary power sources where high volumetric energy density and high volumetric output density are required.

Although the lithium-ion battery is exemplified as the electrical device in the present embodiment, the electrical device is not limited to the lithium-ion battery. The electrical device is applicable as a secondary battery of other type or a primary battery. Further, the electrical device is applicable as not only a battery but also a capacitor.

EXAMPLES

The present invention will be described in more detail by way of the following examples. It should be understood that the technical scope of the present invention is not limited to the following examples.

Example 1

Samples 1 to 33

1. Production of Evaluation Cells
(1) Preparation of Evaluation Electrodes

Evaluation electrodes were prepared by sputtering of thin film alloys of various alloy compositions.

More specifically, thin film alloys of various alloy compositions (samples 1 to 33) was formed under the following sputtering conditions, target specs and electrode sample specs with the use of an independently controllable ternary DC magnetron sputtering apparatus (combinatorial sputter coating apparatus manufactured by Yamato-Kiki Industrial Co., Ltd.; gun-sample distance: about 100 mm). It is noted that the samples 19 to 33 were not ternary alloys. The sample 19 was of Si metal. The samples 20 to 27 were of Si—C binary alloys. The samples 28 to 33 were of Si—Al binary alloys. The DC power sources and the target specs were controlled depending on the alloy composition, i.e., by reducing the number of targets in accordance with the alloy composition and stopping the power source for the reduced target.

(i) The sputtering conditions were as follows.
1) Base pressure: up to 7×10 Pa
2) Sputtering gas: Ar (99.9999% or more)
3) Sputtering gas introduction amount: 10 sccm
4) Sputtering pressure: 30 mTorr
5) DC power source: Si (185 W), C (50 to 200 W), Al (30 to 90 W)
6) Pre-sputtering time: 1 min.
7) Sputtering time: 10 min.
8) Substrate heating: room temperature (ii) The target specs were as follows (manufactured by Kojundo Chemical Lab. Co., Ltd.).
1) Si target (4N): diameter: 2 inches, thickness: 3 mm+oxygen-free copper backing plate, thickness: 2 mm
2) C target (5N): diameter: 2 inches, thickness: 5 mm
3) Al target (4N): diameter: 2 inches, thickness: 5 mm (iii) The electrode specs were as follows.
1) Substrate (collector): Ni foil (thickness: 20 μm)
2) Sputtering film thickness: Si was always 100 nm; and the additive elements (C and Al) were changed appropriately for each sputtering power level. More specifically, the DC power source was controlled for each sputtering power level such that the thickness was increased with increase in each of the concentrations of the additive elements (C and Al).
3) Alloy composition ratio: see TABLE 1.

The amorphous alloy thin films were formed on Ni substrates by using the Si target, the C target and the Al target, fixing the sputtering time and changing the power levels of the DC power source within the above-specified ranges. These alloy samples 1 to 33 were obtained as the evaluation electrodes. As to the samples 19 to 33, the alloy thin films were formed such that: the sample 19 was of Si metal; the samples 20 to 27 were of Si—C binary alloys; and the samples 28 to 33 were of Si—Al binary alloys. More specifically, the amorphous Si and binary alloy thin films were formed on Ni substrates by using the required one or ones of the Si, C and Al targets, fixing the sputtering time and changing the power levels of the DC power source within the above-specified ranges. These alloy samples 19 to 33 were obtained as the evaluation electrodes. As one example of sample preparation, the sample 8 was formed in such a manner that the thin film alloy had the alloy composition shown in TABLE 1 by setting the DC power source 2 (Si target) to 185 W, the DC power source 1 (C target) to 100 W and the DC power source 3 (Al target) to 120 W.

The above-obtained alloy samples 1 to 33 were analyzed by the following analysis methods and analysis apparatuses.

1) Composition analysis: SEM/EDX analysis (JEOL Ltd.), EPMA analysis (JEOL Ltd.)

2) Film thickness measurement (for sputtering rate calculation): film thickness meter (Tokyo Instruments, Inc.)

3) Film state analysis: Raman spectroscopic analysis (Bruker Japan Co., Ltd.)

(2) Production of Evaluation Cells (CR2032 Type Coin Cells)

Using the evaluation electrodes obtained in the above section (1), coil cells were produced as evaluation cells under the following specs.

(i) The coin cell specs were as follows.

1) Counter electrode: Li foil (diameter: 15 mm, thickness: 200 μm, manufactured by Honjo Metal Co., Ltd.)

As the counter electrode, positive electrode slurry electrode (e.g. $LiCoO_2$, $LiNiO_2$, $LiMn_2O_4$, $Li(Ni, Mn, Co)O_2$, $Li(Li, Ni, Mn, Co)O_2$, $LiRO_2$—$LiMn_2O_4$ (R=transition metal element such as Ni, Mn, and Co) may be used.

2) Coin cell: CR2032 type

3) Separator: Celgard 2400 (manufactured by Celgard, LLC.)

4) Electrolyte solution: 1M $LiPF_6$/EC+DEC (1:1 (volume ratio))

5) Evaluation electrode: Alloy samples 1 to 33 (see TABLE 1) obtained in the above section (1)

The evaluation cells (CR2032 type coin cells) were produced by combining the evaluation electrodes with the Li foil (counter electrode), the separator and the electrolyte solution.

2. Charge/Discharge Test Conditions and Evaluation Method (1) Charge/Discharge Test Conditions (i) The charge/discharge test conditions for the evaluation cells were as follows, 1) Charge/discharge tester: HJ0501SM8A (manufactured by Hokuto Denko Corporation)

2) Charge/discharge conditions:
[Charging step] 0.1 mA, from 2 V to 10 mV (constant current/constant voltage mode);
[Discharging step] 0.1 mA, from 10 mV to 2 V (constant current mode)

3) Thermostat bath: PFU-3K (manufactured by ESPEC Corp.)

4) Evaluation temperature: 300K (27° C.)

Using a charge/discharge tester, charging step (Li intercalation to the evaluation cell) was performed in a thermostat bath maintained at an evaluation temperature so as to charge the evaluation cell at 0.1 mA from 2 V to 10 mV in constant current/constant voltage mode. After that, discharging step (Li release from the evaluation cell) was performed to discharge the evaluation cell at 0.1 mA from 10 mV to 2 V in constant current mode. Charge/discharge test was carried out by setting the above-described charging and discharging step as one cycle under the same charge/discharge conditions from the initial cycle (1st cycle) to the 50th cycle.

(2) Evaluation Method

The charge/discharge capacity was calculated per alloy weight.

In view of the fact that, in the long-term cycle operation, electrolyte solution deterioration mode is included in cycle performance (cycle performance is improved by using a high-performance electrolyte solution), the data of the 50th-cycle where alloy-originated components were remarkable was adopted. The obtained results are indicated in TABLE 1.

TABLE 1

| Sample No. | Active material composition (wt %) | | | 1st cycle | | 50th cycle Discharge capacity retention (%) |
|---|---|---|---|---|---|---|
| | Si | C | Al | Discharge capacity (mAh/g) | Charge/ discharge efficiency (%) | |
| 1 | 61 | 19 | 20 | 1836 | 97 | 83 |
| 2 | 51 | 16 | 33 | 1490 | 97 | 84 |
| 3 | 44 | 14 | 42 | 1277 | 96 | 83 |
| 4 | 53 | 29 | 18 | 1659 | 97 | 82 |
| 5 | 46 | 25 | 29 | 1401 | 97 | 82 |
| 6 | 71 | 5 | 24 | 2173 | 99 | 81 |
| 7 | 58 | 4 | 38 | 1763 | 99 | 81 |
| 8 | 50 | 3 | 47 | 1484 | 99 | 89 |
| 9 | 47 | 37 | 16 | 1532 | 99 | 47 |
| 10 | 41 | 33 | 26 | 1301 | 99 | 41 |
| 11 | 36 | 29 | 35 | 1113 | 99 | 25 |
| 12 | 47 | 3 | 50 | 1280 | 98 | 88 |
| 13 | 45 | 3 | 52 | 1243 | 98 | 87 |
| 14 | 43 | 3 | 54 | 1192 | 99 | 82 |
| 15 | 41 | 3 | 56 | 1133 | 99 | 77 |
| 16 | 70 | 20 | 10 | 2408 | 96 | 64 |
| 17 | 70 | 15 | 15 | 1930 | 94 | 74 |
| 18 | 80 | 10 | 10 | 3037 | 94 | 43 |
| 19 | 100 | 0 | 0 | 3332 | 93 | 47 |
| 20 | 97 | 3 | 0 | 3059 | 91 | 39 |
| 21 | 94 | 6 | 0 | 3075 | 92 | 37 |
| 22 | 90 | 10 | 0 | 2994 | 91 | 36 |
| 23 | 87 | 13 | 0 | 2889 | 91 | 32 |
| 24 | 84 | 16 | 0 | 2866 | 91 | 28 |
| 25 | 81 | 19 | 0 | 2775 | 91 | 14 |
| 26 | 79 | 21 | 0 | 2708 | 93 | 32 |
| 27 | 76 | 24 | 0 | 2563 | 91 | 59 |
| 28 | 61 | 0 | 39 | 1747 | 90 | 34 |
| 29 | 66 | 0 | 34 | 1901 | 90 | 37 |
| 30 | 72 | 0 | 28 | 2119 | 90 | 45 |
| 31 | 78 | 0 | 22 | 2471 | 91 | 45 |
| 32 | 87 | 0 | 13 | 2805 | 91 | 44 |
| 33 | 97 | 0 | 3 | 3031 | 91 | 47 |

(1) The "discharge capacity (mAh/g)" in TABLE represents the capacity for the reaction of Li with the Si—C—Al alloy (pure Si, Si—C alloy or Si—Al alloy) and was determined per pure Si or alloy weight. The term "initial capacity" used in the specification corresponds to the "discharge capacity (mAh/g)" at the initial cycle (1st cycle).

(2) The "discharge capacity retention (%)" in TABLE represents the index for "how much of the initial capacity could be retained" and was determined by the following formula.

Discharge capacity at 50th cycle/Maximum discharge capacity×100    [Formula]

In general, the maximum discharge capacity was exhibited during the period from the initial cycle to the 10th cycle, normally from the 5th to 10th cycles.

(3) The value of "charge/discharge efficiency (%)" in TABLE represents the index for "how much Li could be moved during charge/discharge operation" and was determined by the following formula.

Discharge capacity (during Li release)/Charge capacity(during reaction with Li, i.e., during Li intercalation)×100    [Formula]

As is seen from the results of TABLE 1, the cells using the samples 1 to 18, in particular, the samples within the composition range enclosed by the solid thick line in FIGS. 7 to 9 had a significantly high 1st-cycle discharge capacity that could hardly be realized by those using conventional carbon-based negative electrode active materials (carbon/graphite-based negative electrode active materials). The cells using the samples 1 to 18 were also higher in capacity (initial capacity: 1113 mAh/g or higher) than those using conventional high-capacity Sn-based alloy negative electrode active materials. Further, the cells using the samples 1 to 18 had a high 1st-cycle charge/discharge efficiency of 94% or higher, preferably 97% or higher, and thereby had a higher effective cell capacity than the cells using the samples 19 to 33. In many of the cells using the samples 19 to 33, the effective cell capacity was deteriorated due to the low initial charge/discharge efficiency. The cells using the samples 1 to 18 had significantly high cycle durability as compared to those using conventional Sn-based negative electrode active material and multi metal alloy negative electrode active material of Patent Document 1 that are high in capacity but poor in cycle durability due to the trade-off relationship between capacity and cycle durability. More specifically, the cells using the samples 1 to 18 had a significantly high charge/discharge capacity retention of 64% or higher, preferably 74% or higher, more preferably 81% or higher, at the 50th-cycle as the cycle durability. It was possible for the cells using the samples 1 to 18 to suppress a deterioration of initial capacity or effective capacity and maintain a high capacity since the cells using the samples 1 to 18, in particular, the samples within the composition range enclosed by the solid thick line in FIGS. 7 to 9 had a higher discharge capacity retention than the cell with the other samples.

It has been shown by the results of the present example that it is very useful and effective to select the first additive element C, which has the function of preventing amorphous-to-crystalline phase transition at the time of alloying of Si with Li to obtain improvement in cycle lifetime, and the second additive element Al, which has the function of not causing a decrease of electrode capacity with increase in the concentration of the first additive element. The selection of such first and second additive elements makes it possible to provide the Si alloy-containing negative electrode active material with high capacity, high cycle durability and high initial charge/discharge efficiency and thereby makes it possible to provide the lithium-ion secondary battery with high capacity, high initial charge/discharge efficiency and high cycle durability. In the cells using the Si metal and binary alloy samples 19 to 33, all of the characteristics, that is, high capacity, high initial charge/discharge efficiency and high cycle durability were not obtained with good balance.

Example 2

Figure 10:
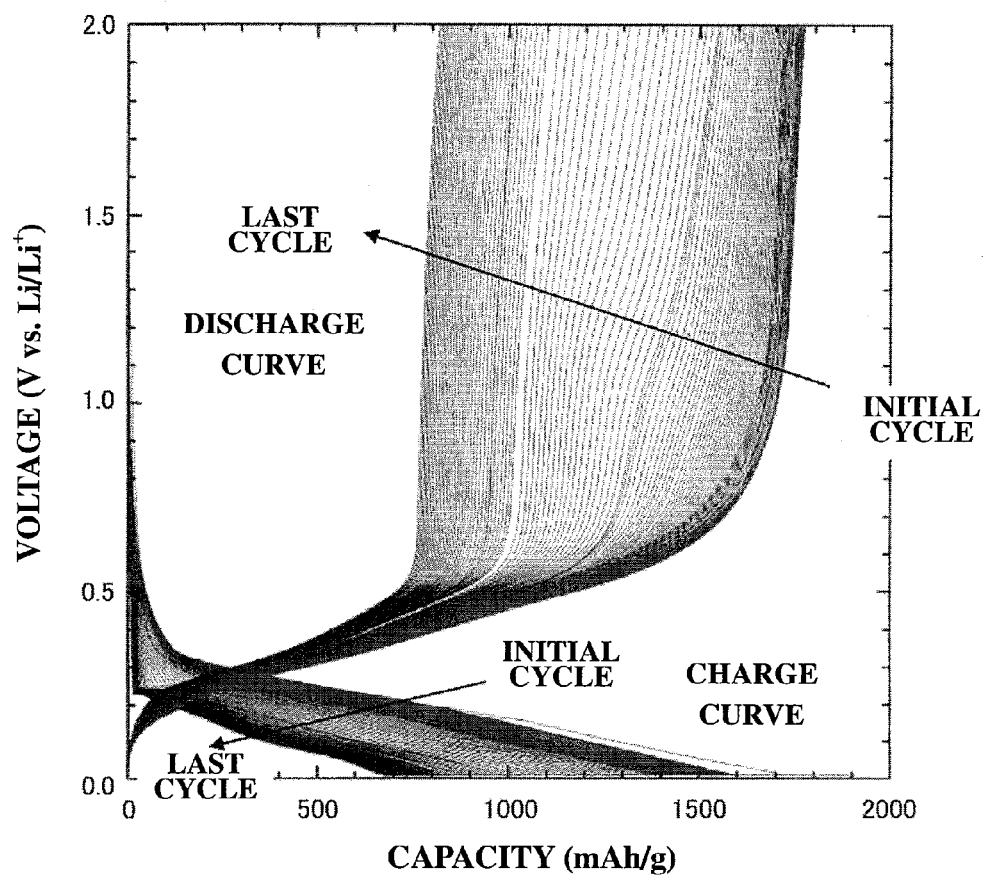
FIG. 10 is a diagram showing all of 1st- to 50th-cycle charge/discharge curves of evaluation cell (CR2032 type coin cell) using the Si(58 wt %)-C(4 wt %)-Al(38 wt %) alloy of Sample No. 7 of Example 1 as the negative electrode active material in evaluation electrode.

FIG. 10 is a diagram showing all of 1st- to 50th-cycle charge/discharge curves of the evaluation cell using the sample 7.

As is seen from FIG. 10, the evaluation cell using the sample 7 showed a charge/discharge curve with a stable and flat voltage profile at each of the 1st to 50th cycles and maintained a high capacity up until the 50th cycle with no sudden deterioration of cycle performance and capacity performance (no sudden drop in charge/discharge curve=capacity).

Based on the above experimental results, the mechanism by which the tertiary alloy according to the present embodiment could attain well-balanced characteristics to combine high initial capacity and initial charge/discharge efficiency with high cycle performance (in particular, high discharge capacity retention at the 50th cycle) can be assumed as follows.

1. The cells using the tertiary alloy samples 1 to 18 each having the composition represented by the formula $Si_xC_yAl_z$ according to the present embodiment, in particular, the samples within the composition range enclosed by the solid thick line in FIGS. 7 to 9, were able to limit decomposition of the electrolytic solution and prevent transition of the Li—Si alloy to crystalline phase as compared to those using the pure Si sample 19, tertiary and quaternary alloys of Patent Document 1 and the binary alloy samples 20 to 33.

2. By decomposition of the electrolytic solution, there occurs a decrease of apparent charge/discharge capacity and a deterioration of charge/discharge efficiency. In fact, the charge/discharge efficiency was deteriorated to a lower level in the case of using the pure Si sample 19, tertiary and quaternary alloys of Patent Document 1 and the binary alloy samples 20 to 33. By contrast, it was possible to attain a high capacity and suppress a deterioration of discharge capacity retention or charge/discharge efficiency in the case of using the tertiary alloy samples each having the composition represented by the formula $Si_xC_yAl_z$ according to the present embodiment, in particular, the samples within the composition range enclosed by the solid thick line in FIGS. 7 to 9 (see TABLE 1).

3. There would occur a large volume change of the active material by transition of the Li—Si alloy to crystalline phase so as to initiate breakage of the active material and then breakage of the electrode. In the cells using the tertiary alloy samples each having the composition represented by the formula $Si_xC_yAl_z$ according to the present embodiment, in particular, the samples within the composition range enclosed by the solid thick line in FIGS. 7 to 9, it was possible to prevent a decrease of apparent charge/discharge capacity and a deterioration of charge/discharge efficiency caused by the breakage of the active material and breakage of the electrode due to such phase transition. These samples were able to maintain a high discharge capacity retention even at the 50th cycle, limit the rate of decrease of the capacity to a small degree and show stable performance characteristics. It is thus judged that the phase transition could be prevented by the use of these samples.

The invention claimed is:

1. A negative electrode, comprising:
a negative electrode active material for an electrical device, the negative electrode active material comprising an alloy having a composition represented by the formula $Si_xC_yAl_z$, wherein x, y and z represent mass percent values and satisfy the conditions: $x+y+z=100$; $43 \leq x \leq 61$; $3 \leq y \leq 29$; and $20 \leq z \leq 54$.

2. An electrical device, comprising:
a negative electrode comprising
a negative electrode active material comprising an alloy having a composition represented by the formula $Si_xC_yAl_z$, wherein x, y and z represent mass percent values and satisfy the conditions: $x+y+z=100$; $43 \leq x \leq 61$; $3 \leq y \leq 29$; and $20 \leq z \leq 54$.

3. A lithium-ion secondary battery, comprising:
a negative electrode comprising
a negative electrode active material comprising an alloy having a composition represented by the formula $Si_xC_yAl_z$, wherein x, y and z represent mass percent values and satisfy the conditions: $x+y+z=100$; $43 \leq x \leq 61$; $3 \leq y \leq 29$; and $20 \leq z \leq 54$.

* * * * *